US012013357B2

(12) United States Patent
Mills et al.

(10) Patent No.: US 12,013,357 B2
(45) Date of Patent: Jun. 18, 2024

(54) APPARATUS FOR FAST PYROLYSIS REACTIONS AND METHODS THEREOF

(71) Applicant: THE TEXAS A&M UNIVERSITY SYSTEM, College Station, TX (US)

(72) Inventors: Patrick L. Mills, College Station, TX (US); Arvind Nanduri, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 319 days.

(21) Appl. No.: 17/318,482

(22) Filed: May 12, 2021

(65) Prior Publication Data

US 2021/0356414 A1 Nov. 18, 2021

Related U.S. Application Data

(60) Provisional application No. 63/023,421, filed on May 12, 2020.

(51) Int. Cl.
*G01N 25/02* (2006.01)

(52) U.S. Cl.
CPC .................................... *G01N 25/02* (2013.01)

(58) Field of Classification Search
CPC ...... H02P 21/18; H02P 21/26; H02P 2207/01; C10B 53/02; C10B 57/06; G01N 25/02; G01N 31/12; Y02E 50/10
See application file for complete search history.

(56) References Cited

U.S. PATENT DOCUMENTS

2017/0362512 A1* 12/2017 Hornung ................. C10B 53/02

FOREIGN PATENT DOCUMENTS

RU 2710020 C2 * 12/2019 .............. C02F 11/10
WO WO-2013055819 A1 * 4/2013 ............ C12M 21/02

OTHER PUBLICATIONS

RU2710020C2—Catalytic modification of pyrolytic vapour—English Translations; Dec. 2019 (Year: 2019).*

* cited by examiner

*Primary Examiner* — Ellen M McAvoy
*Assistant Examiner* — Chantel Graham
(74) *Attorney, Agent, or Firm* — Barnes & Thornburg LLP

(57) ABSTRACT

The present disclosure an improved apparatus for fast pyrolysis and methods associated with the apparatus. For instance, the present disclosure provides methods for analyzing intermediate products formed via a fast pyrolysis reaction utilizing one or more pulses of pyrolysis vapor through a valve in the apparatus. The described methods provide improved identification of products formed in the fast pyrolysis reaction by using millisecond time resolution for qualitative and/or quantitative analysis.

20 Claims, 12 Drawing Sheets

APPARATUS FOR FAST PYROLYSIS REACTIONS AND METHODS THEREOF

CROSS-REFERENCE TO RELATED APPLICATIONS

This application claims priority under 35 U.S.C. § 119(e) to U.S. Provisional Application No. 63/023,421, filed on May 12, 2020, the entire disclosure of which is incorporated herein by reference.

TECHNICAL FIELD

The present disclosure relates to an improved apparatus for fast pyrolysis and associated methods. More particularly, the present disclosure includes methods for analyzing intermediate and final products formed via a fast pyrolysis reaction utilizing one or more pulses of pyrolysis vapor through a valve in the apparatus. The described methods provide improved identification of products formed in the fast pyrolysis reaction by using a millisecond time resolution for qualitative and/or quantitative analysis of intermediate and final products.

BACKGROUND AND SUMMARY

Pyrolysis refers to the thermal decomposition of materials brought about by high temperatures. Pyrolysis is most commonly used in the treatment of organic materials and involves a change in chemical composition of the materials. Further, "fast pyrolysis" is a thermochemical route providing an efficient method to convert solid biomass and other sources of solid materials to liquid compositions, for instance liquid fuels and chemicals. Fast pyrolysis is performed by rapid heating of the solid feedstock to very high temperatures using short residence times of the pyrolysis vapors in the reactor in order to obtain high quality pyrolysis products.

However, due to the extremely rapid reaction times required for a fast pyrolysis reaction, current commercial systems do not have the capability to perform millisecond-scale analyses of the pyrolysis vapors or the formed intermediate and final products. As a result, the intermediates and final products of a fast pyrolysis reaction are difficult to predict and must rely upon complex theories, such as Density Functional Theory (DFT) models. Therefore, there exists a need for new apparatus reactors and methods that can analyze fast pyrolysis intermediate products with millisecond or sub-millisecond time resolution, thereby provide a more accurate prediction to the identity of the resultant pyrolysis products.

Therefore, the present disclosure provides an improved apparatus for fast pyrolysis and associated analytical methods. The described methods are capable of analyzing intermediate products formed via a fast pyrolysis by using a millisecond or sub-millisecond time resolution for qualitative and/or quantitative analysis.

The apparatus and methods of the present disclosure provide several advantages and improvements compared to the state of the art. First, the apparatus utilizes a valve capable of pulsing pyrolysis vapor for analysis of intermediate products that is coupled or interfaced with an appropriate method or instrument for time-resolved detection, such as mass spectrometry. The valve can provide pulses on a millisecond or sub-millisecond time frame for analysis of pyrolysis products compared to currently available mechanisms or methods that operate on a time frame of seconds, tens of seconds or longer, such as the order of minutes.

Second, the described apparatus can be adapted to evaluate any type of solid biomass or other appropriate source of solid material and tailor the described methods for accurate identification of intermediate pyrolysis products. Third, the methods described herein can provide time-resolved experimental evidence of intermediate and final products of a fast pyrolysis reaction in contrast to the theoretical models that are prevalent in the art.

Fourth, the apparatus can provide millisecond (or sub-millisecond) time resolution for detection of intermediates and final pyrolysis products when operated according to the described timed-sequence.

Finally, by evaluating the intermediate products and predicting the pyrolysis products with millisecond or sub-millisecond time resolution, the present disclosure provides an improved ultimate pyrolysis product. For instance, an improved pyrolysis oil can be obtained that can be used as a liquid fuel, liquid chemical or as other important end products for commercial uses.

In illustrative embodiments, a method for analyzing one or more intermediate products formed via a fast pyrolysis reaction is provided. The method comprises the steps of i) performing the fast pyrolysis reaction on a solid biomass composition or other suitable solid feedstock to produce a pyrolysis vapor; ii) pulsing one or more portions of the pyrolysis vapor through a valve; and iii) analyzing the one or more portions of the pyrolysis vapor to identify the one or more intermediate products. These steps are conducted in a sequence so that temporal resolution of the intermediates and final products can be performed.

In illustrative embodiments, an apparatus for fast pyrolysis is provided. The apparatus comprises i) a valve, ii) a probe rod assembly, and iii) an interface housing.

In illustrative embodiments, a pyrolysis oil prepared from an intermediate product of a fast pyrolysis reaction is provided, wherein the intermediate product is analyzed according to the described methods.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 displays the problems associated with current practices to evaluate products in a fast pyrolysis reactor. As shown in FIG. 1, the time delays in obtaining results prevents existing systems from accurately measuring pyrolysis products with millisecond or sub-millisecond time resolution. For instance, the time scale required for current systems greatly exceeds the expedited time frames necessary to detect reactive intermediate products in the reaction mixture.

FIG. 2 shows an exemplary schematic of the apparatus of the present disclosure. The probe rod is shown coupled to the valve that provides the pulsing according to the disclosure. The pulse of pyrolysis vapors (e.g., "Gas pulse") is depicted as exiting the valve.

FIG. 3A depicts an exemplary apparatus of the present disclosure. The probe rod assembly, valve, and interface housing elements are shown as well as the gas inlet and outlets. The direction of the pulse of pyrolysis vapors from the valve is depicted as well as the analysis of the pulsed vapors. FIG. 3B shows the exemplary heating element of the probe rod assembly, including a quartz tube and platinum coil according to certain embodiments of the disclosure.

FIG. 4 displays the movement of pyrolysis vapors through various aspects of the present disclosure.

FIG. 5 displays an exemplary valve of the present disclosure. As shown in FIG. 5, the exemplary valve comprises a base with a 0.004 inch orifice. The orifice size can be varied as one means to control the concentration of the gas pulse that is generated.

FIG. 6 displays a schematic of an exemplary valve of the present disclosure.

FIG. 7 displays an analysis of solid biomass undergoing a fast pyrolysis reaction. In this figure, Rio Red grapefruit waste was used as the solid biomass and no catalyst was utilized. As shown on the right side of the figure, various pyrolysis products were identified from the reaction.

FIG. 8 displays an analysis of solid biomass undergoing a fast pyrolysis reaction. In this figure, Rio Red grapefruit waste was used as the solid biomass and a ZSM-5 zeolite catalyst was utilized. As shown on the right side of the figure, various pyrolysis products were identified from the reaction.

FIG. 9 displays an analysis of solid biomass undergoing a fast pyrolysis reaction. In this figure, Cassava peel was used as the solid biomass and a ZSM-5 zeolite catalyst was utilized. As shown on the right side of the figure, various pyrolysis products were identified from the reaction.

DETAILED DESCRIPTION

Figure 1:
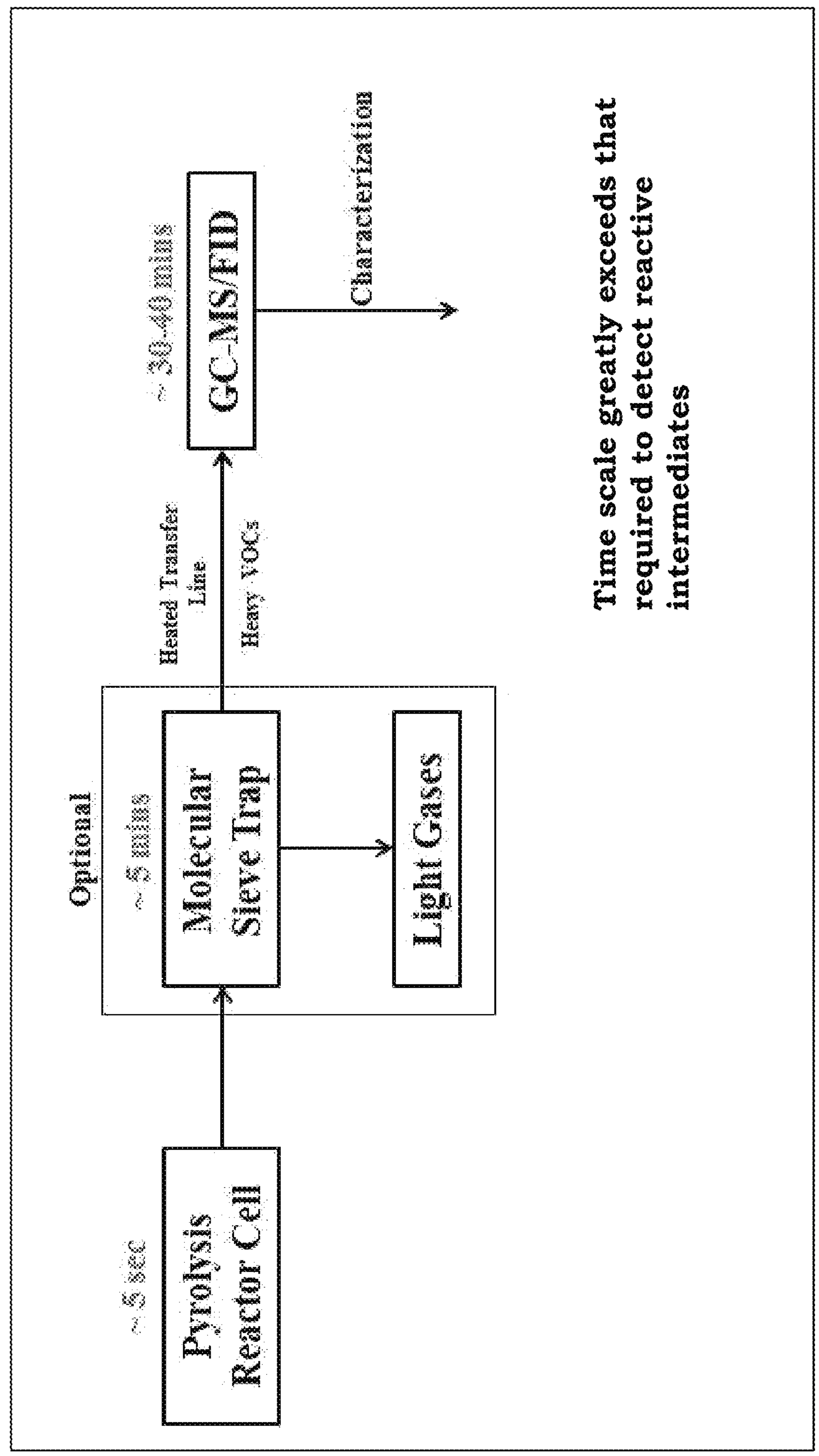

The following numbered embodiments are contemplated and are non-limiting:

1. A method for analyzing one or more intermediate products formed via a fast pyrolysis reaction, said method comprising the steps of:

i) performing the fast pyrolysis reaction on a solid biomass composition to produce a pyrolysis vapor;

ii) pulsing one or more portions of the pyrolysis vapor through a valve; and iii) analyzing the one or more portions of the pyrolysis vapor to identify the one or more intermediate products.

2. The method of clause 1, any other suitable clause, or any combination of suitable clauses, wherein the fast pyrolysis reaction is performed at a temperature in a range from 100° C.-1400° C.

3. The method of clause 1, any other suitable clause, or any combination of suitable clauses, wherein the fast pyrolysis reaction is performed at a temperature in a range from 100° C.-1000° C.

4. The method of clause 1, any other suitable clause, or any combination of suitable clauses, wherein the fast pyrolysis reaction is performed at a temperature in a range from 200° C.-900° C.

5. The method of clause 1, any other suitable clause, or any combination of suitable clauses, wherein the fast pyrolysis reaction is performed at a temperature in a range from 300° C.-800° C.

6. The method of clause 1, any other suitable clause, or any combination of suitable clauses, wherein the fast pyrolysis reaction is performed at a temperature in a range from 200° C.-400° C.

7. The method of clause 1, any other suitable clause, or any combination of suitable clauses, wherein the fast pyrolysis reaction is performed at a temperature in a range from 200° C.-300° C.

8. The method of clause 1, any other suitable clause, or any combination of suitable clauses, wherein the fast pyrolysis reaction is performed at a temperature in a range from 300° C.-400° C.

9. The method of clause 1, any other suitable clause, or any combination of suitable clauses, wherein the fast pyrolysis reaction is performed at a temperature in a range from 400° C.-600° C.

10. The method of clause 1, any other suitable clause, or any combination of suitable clauses, wherein the fast pyrolysis reaction is performed at a temperature in a range from 400° C.-500° C.

11. The method of clause 1, any other suitable clause, or any combination of suitable clauses, wherein the fast pyrolysis reaction is performed at a temperature in a range from 500° C.-600° C.

12. The method of clause 1, any other suitable clause, or any combination of suitable clauses, wherein the fast pyrolysis reaction is performed at a temperature in a range from 600° C.-800° C.

13. The method of clause 1, any other suitable clause, or any combination of suitable clauses, wherein the fast pyrolysis reaction is performed at a temperature in a range from 600° C.-700° C.

14. The method of clause 1, any other suitable clause, or any combination of suitable clauses, wherein the fast pyrolysis reaction is performed at a temperature in a range from 700° C.-800° C.

15. The method of clause 1, any other suitable clause, or any combination of suitable clauses, wherein the fast pyrolysis reaction is performed at a temperature in a range from 800° C.-1000° C.

16. The method of clause 1, any other suitable clause, or any combination of suitable clauses, wherein the fast pyrolysis reaction is performed at a temperature in a range from 800° C.-900° C.

17. The method of clause 1, any other suitable clause, or any combination of suitable clauses, wherein the fast pyrolysis reaction is performed at a temperature in a range from 900° C.-1000° C.

18. The method of clause 1, any other suitable clause, or any combination of suitable clauses, wherein the fast pyrolysis reaction is performed at a heating rate of 5° C. per millisecond (ms).

19. The method of clause 1, any other suitable clause, or any combination of suitable clauses, wherein the fast pyrolysis reaction is performed at a heating rate of 10° C. per millisecond (ms).

20. The method of clause 1, any other suitable clause, or any combination of suitable clauses, wherein the fast pyrolysis reaction is performed at a heating rate of 15° C. per millisecond (ms).

21. The method of clause 1, any other suitable clause, or any combination of suitable clauses, wherein the fast pyrolysis reaction is performed at a heating rate of less than 10° C. per millisecond (ms).

22. The method of clause 1, any other suitable clause, or any combination of suitable clauses, wherein the fast pyrolysis reaction is performed at a heating rate of greater than 10° C. per millisecond (ms).

23. The method of clause 1, any other suitable clause, or any combination of suitable clauses, wherein the fast pyrolysis reaction is performed at a heating rate between 0.01° C. per ms and 20° C. per ms.

24. The method of clause 1, any other suitable clause, or any combination of suitable clauses, wherein the fast pyrolysis reaction is performed at a heating rate between 1° C. per ms and 10° C. per ms.

25. The method of clause 1, any other suitable clause, or any combination of suitable clauses, wherein the fast pyrolysis reaction is performed at a heating rate between 5° C. per ms and 15° C. per ms.

26. The method of clause 1, any other suitable clause, or any combination of suitable clauses, wherein the fast pyrolysis reaction is performed for a duration in a range from 0.1 seconds to 1 second.

27. The method of clause 1, any other suitable clause, or any combination of suitable clauses, wherein the fast pyrolysis reaction is performed for a duration in a range from 1 second to 2 seconds.

28. The method of clause 1, any other suitable clause, or any combination of suitable clauses, wherein the fast pyrolysis reaction is performed for a duration in a range from 1 second to 3 seconds.

29. The method of clause 1, any other suitable clause, or any combination of suitable clauses, wherein the fast pyrolysis reaction is performed for a duration in a range from 1 second to 4 seconds.

30. The method of clause 1, any other suitable clause, or any combination of suitable clauses, wherein the fast pyrolysis reaction is performed for a duration in a range from 1 second to 5 seconds.

31. The method of clause 1, any other suitable clause, or any combination of suitable clauses, wherein the fast pyrolysis reaction is performed for a duration in a range from 2 second to 5 seconds.

32. The method of clause 1, any other suitable clause, or any combination of suitable clauses, wherein the fast pyrolysis reaction is performed for a duration in a range from 3 second to 5 seconds.

33. The method of clause 1, any other suitable clause, or any combination of suitable clauses, wherein the fast pyrolysis reaction is performed for a duration in a range from 4 second to 5 seconds.

34. The method of clause 1, any other suitable clause, or any combination of suitable clauses, wherein the fast pyrolysis reaction is performed for a duration of about 0.001 seconds corresponding to about one millisecond 35. The method of clause 1, any other suitable clause, or any combination of suitable clauses, wherein the fast pyrolysis reaction is performed for a duration of about 0.005 seconds corresponding to about five milliseconds.

36. The method of clause 1, any other suitable clause, or any combination of suitable clauses, wherein the fast pyrolysis reaction is performed for a duration of about 0.01 seconds corresponding to about ten milliseconds.

37. The method of clause 1, any other suitable clause, or any combination of suitable clauses, wherein the fast pyrolysis reaction is performed for a duration of about 0.05 seconds corresponding to about 50 milliseconds.

38. The method of clause 1, any other suitable clause, or any combination of suitable clauses, wherein the fast pyrolysis reaction is performed for a duration of about 0.1 seconds corresponding to about 100 milliseconds.

39. The method of clause 1, any other suitable clause, or any combination of suitable clauses, wherein the fast pyrolysis reaction is performed for a duration of about 0.5 seconds corresponding to about 500 milliseconds.

40. The method of clause 1, any other suitable clause, or any combination of suitable clauses, wherein the fast pyrolysis reaction is performed for a duration of about 1 second.

41. The method of clause 1, any other suitable clause, or any combination of suitable clauses, wherein the fast pyrolysis reaction is performed for a duration of about 2 seconds.

42. The method of clause 1, any other suitable clause, or any combination of suitable clauses, wherein the fast pyrolysis reaction is performed for a duration of about 3 seconds.

43. The method of clause 1, any other suitable clause, or any combination of suitable clauses, wherein the fast pyrolysis reaction is performed for a duration of about 4 seconds.

44. The method of clause 1, any other suitable clause, or any combination of suitable clauses, wherein the fast pyrolysis reaction is performed for a duration of about 5 seconds.

45. The method of clause 1, any other suitable clause, or any combination of suitable clauses, wherein the solid biomass composition comprises agricultural waste.

46. The method of clause 1, any other suitable clause, or any combination of suitable clauses, wherein the solid biomass composition comprises agricultural process waste.

47. The method of clause 1, any other suitable clause, or any combination of suitable clauses, wherein the solid biomass composition comprises fruit pits.

48. The method of clause 1, any other suitable clause, or any combination of suitable clauses, wherein the solid biomass composition comprises corn cobs.

49. The method of clause 1, any other suitable clause, or any combination of suitable clauses, wherein the solid biomass composition comprises straw.

50. The method of clause 1, any other suitable clause, or any combination of suitable clauses, wherein the solid biomass composition comprises wood.

51. The method of clause 1, any other suitable clause, or any combination of suitable clauses, wherein the solid biomass composition comprises wood chips.

52. The method of clause 1, any other suitable clause, or any combination of suitable clauses, wherein the solid biomass composition comprises wood logs.

53. The method of clause 1, any other suitable clause, or any combination of suitable clauses, wherein the solid biomass composition comprises bark.

54. The method of clause 1, any other suitable clause, or any combination of suitable clauses, wherein the solid biomass composition comprises sawdust.

55. The method of clause 1, any other suitable clause, or any combination of suitable clauses, wherein the solid biomass composition comprises solid waste.

56. The method of clause 1, any other suitable clause, or any combination of suitable clauses, wherein the solid biomass composition comprises feedstock.

57. The method of clause 1, any other suitable clause, or any combination of suitable clauses, wherein the solid biomass composition comprises food processing waste.

58. The method of clause 1, any other suitable clause, or any combination of suitable clauses, wherein the solid biomass composition comprises industrial residue.

59. The method of clause 1, any other suitable clause, or any combination of suitable clauses, wherein the solid biomass composition comprises residential residue.

60. The method of clause 1, any other suitable clause, or any combination of suitable clauses, wherein the solid biomass composition comprises citrus waste.

61. The method of clause 1, any other suitable clause, or any combination of suitable clauses, wherein the solid biomass composition is present at a particle size of between 1 micrometer to 2000 micrometers.

62. The method of clause 1, any other suitable clause, or any combination of suitable clauses, wherein the solid biomass composition is present at a particle size of between 1 micrometer to 1000 micrometers.

63. The method of clause 1, any other suitable clause, or any combination of suitable clauses, wherein the solid biomass composition is present at a particle size of between 1 micrometer to 100 micrometers.

64. The method of clause 1, any other suitable clause, or any combination of suitable clauses, wherein the solid biomass composition is present at a particle size of between 10 micrometer to 100 micrometers.

65. The method of clause 1, any other suitable clause, or any combination of suitable clauses, wherein the solid biomass composition is present at a particle size of less than 1000 micrometers.

66. The method of clause 1, any other suitable clause, or any combination of suitable clauses, wherein the solid biomass composition is present at a particle size of less than 100 micrometers.

67. The method of clause 1, any other suitable clause, or any combination of suitable clauses, wherein the solid biomass composition comprises a catalyst.

68. The method of clause 67, any other suitable clause, or any combination of suitable clauses, wherein the catalyst is selected from the group consisting of a zeolite, a metal oxide catalyst, a heterogeneous catalyst, and any combination thereof.

69. The method of clause 1, any other suitable clause, or any combination of suitable clauses, wherein the solid biomass composition does not comprise a catalyst.

70. The method of clause 69, any other suitable clause, or any combination of suitable clauses, wherein the catalyst is selected from the group consisting of a zeolite, a metal oxide catalyst, a heterogeneous catalyst, and any combination thereof.

71. The method of clause 1, any other suitable clause, or any combination of suitable clauses, wherein the valve is coupled to a probe rod assembly.

72. The method of clause 71, any other suitable clause, or any combination of suitable clauses, wherein the probe rod assembly comprises a heating element.

73. The method of clause 71, any other suitable clause, or any combination of suitable clauses, wherein the probe rod assembly comprises a quartz tube.

74. The method of clause 71, any other suitable clause, or any combination of suitable clauses, wherein the probe rod assembly comprises a heating coil, preferably a platinum coil, a tantalum wire, a ferritic iron-chromium-aluminium alloy (FeCrAl alloy; Kanthal® A-1), or any combination thereof.

75. The method of clause 71, any other suitable clause, or any combination of suitable clauses, wherein the probe rod assembly is configured to have a residence time between 50-100 ms.

76. The method of clause 1, any other suitable clause, or any combination of suitable clauses, wherein the valve is coupled to an interface housing.

77. The method of clause 76, any other suitable clause, or any combination of suitable clauses, wherein the interface housing comprises an inlet.

78. The method of clause 77, any other suitable clause, or any combination of suitable clauses, wherein the inlet is an inlet for a gas.

79. The method of clause 77, any other suitable clause, or any combination of suitable clauses, wherein the inlet is configured to have a flow of about 1 ml/min to about 1000 ml/min.

80. The method of clause 76, any other suitable clause, or any combination of suitable clauses, wherein the interface housing comprises an outlet.

81. The method of clause 80, any other suitable clause, or any combination of suitable clauses, wherein the outlet is an outlet for a gas.

82. The method of clause 80, any other suitable clause, or any combination of suitable clauses, wherein the outlet is configured to have a pressure of between 400-760 torr.

83. The method of clause 76, any other suitable clause, or any combination of suitable clauses, wherein the valve is positioned between the inlet and the outlet of the interface housing.

84. The method of clause 1, any other suitable clause, or any combination of suitable clauses, wherein the step of pulsing is performed one time.

85. The method of clause 1, any other suitable clause, or any combination of suitable clauses, wherein the step of pulsing is performed two times.

86. The method of clause 1, any other suitable clause, or any combination of suitable clauses, wherein the step of pulsing is performed three time.

87. The method of clause 1, any other suitable clause, or any combination of suitable clauses, wherein the step of pulsing is performed four time.

88. The method of clause 1, any other suitable clause, or any combination of suitable clauses, wherein the step of pulsing is performed five or more times.

89. The method of clause 1, any other suitable clause, or any combination of suitable clauses, wherein the step of pulsing is performed at a duration of between 0.01 millisecond and 1000 milliseconds.

90. The method of clause 1, any other suitable clause, or any combination of suitable clauses, wherein the step of pulsing is performed at a duration of between 1 millisecond and 1000 milliseconds.

91. The method of clause 1, any other suitable clause, or any combination of suitable clauses, wherein the step of pulsing is performed at a duration of between 10 milliseconds and 100 milliseconds.

92. The method of clause 1, any other suitable clause, or any combination of suitable clauses, wherein the step of pulsing is performed at a duration of between 100 milliseconds and 200 milliseconds.

93. The method of clause 1, any other suitable clause, or any combination of suitable clauses, wherein the step of pulsing is performed at a duration of between 200 milliseconds and 300 milliseconds.

94. The method of clause 1, any other suitable clause, or any combination of suitable clauses, wherein the step of pulsing is performed at a duration of between 300 milliseconds and 400 milliseconds.

95. The method of clause 1, any other suitable clause, or any combination of suitable clauses, wherein the step of pulsing is performed at a duration of between 400 milliseconds and 500 milliseconds.

96. The method of clause 1, any other suitable clause, or any combination of suitable clauses, wherein the step of pulsing is performed at a duration of between 100 milliseconds and 500 milliseconds.

97. The method of clause 1, any other suitable clause, or any combination of suitable clauses, wherein the step of pulsing is performed at a duration of between 500 milliseconds and 1000 milliseconds.

98. The method of clause 1, any other suitable clause, or any combination of suitable clauses, wherein the step of pulsing is performed at a duration of about 1 millisecond.

99. The method of clause 1, any other suitable clause, or any combination of suitable clauses, wherein the step of pulsing is performed at a duration of about 10 milliseconds.

100. The method of clause 1, any other suitable clause, or any combination of suitable clauses, wherein the step of pulsing is performed at a duration of about 50 milliseconds.

101. The method of clause 1, any other suitable clause, or any combination of suitable clauses, wherein the step of pulsing is performed at a duration of about 100 milliseconds.

102. The method of clause 1, any other suitable clause, or any combination of suitable clauses, wherein the step of pulsing is performed at a duration of about 200 milliseconds.

103. The method of clause 1, any other suitable clause, or any combination of suitable clauses, wherein the step of pulsing is performed at a duration of about 300 milliseconds.

104. The method of clause 1, any other suitable clause, or any combination of suitable clauses, wherein the step of pulsing is performed at a duration of about 400 milliseconds.

105. The method of clause 1, any other suitable clause, or any combination of suitable clauses, wherein the step of pulsing is performed at a duration of about 500 milliseconds.

106. The method of clause 1, any other suitable clause, or any combination of suitable clauses, wherein the step of pulsing is performed at a duration of about 600 milliseconds.

107. The method of clause 1, any other suitable clause, or any combination of suitable clauses, wherein the step of pulsing is performed at a duration of about 700 milliseconds.

108. The method of clause 1, any other suitable clause, or any combination of suitable clauses, wherein the step of pulsing is performed at a duration of about 800 milliseconds.

109. The method of clause 1, any other suitable clause, or any combination of suitable clauses, wherein the step of pulsing is performed at a duration of about 900 milliseconds.

110. The method of clause 1, any other suitable clause, or any combination of suitable clauses, wherein the step of pulsing is performed at a duration of about 1000 milliseconds.

111. The method of clause 1, any other suitable clause, or any combination of suitable clauses, wherein the step of pulsing is performed at a repetition rate of greater than 10 pulses within 5 seconds.

112. The method of clause 1, any other suitable clause, or any combination of suitable clauses, wherein the step of pulsing is performed at a repetition rate of greater than 100 pulses within 5 seconds.

113. The method of clause 1, any other suitable clause, or any combination of suitable clauses, wherein the step of pulsing is performed at a repetition rate of greater than 10 pulses within 1 second.

114. The method of clause 1, any other suitable clause, or any combination of suitable clauses, wherein the step of pulsing is performed at a repetition rate of greater than 100 pulses within 1 second.

115. The method of clause 1, any other suitable clause, or any combination of suitable clauses, wherein the step of pulsing is performed at a repetition rate of greater than 100 pulses within 2 seconds.

116. The method of clause 1, any other suitable clause, or any combination of suitable clauses, wherein the step of pulsing is performed at a repetition rate of greater than 100 pulses within 3 seconds.

117. The method of clause 1, any other suitable clause, or any combination of suitable clauses, wherein the step of pulsing is performed at a repetition rate of greater than 100 pulses within 4 seconds.

118. The method of clause 1, any other suitable clause, or any combination of suitable clauses, wherein the step of pulsing is performed at a repetition rate of greater than 100 pulses within 5 seconds.

119. The method of clause 1, any other suitable clause, or any combination of suitable clauses, wherein the step of pulsing provides one portion of the pyrolysis vapor through the valve.

120. The method of clause 1, any other suitable clause, or any combination of suitable clauses, wherein the step of pulsing provides two portions of the pyrolysis vapor through the valve.

121. The method of clause 1, any other suitable clause, or any combination of suitable clauses, wherein the step of pulsing provides three portions of the pyrolysis vapor through the valve.

122. The method of clause 1, any other suitable clause, or any combination of suitable clauses, wherein the step of pulsing provides four portions of the pyrolysis vapor through the valve.

123. The method of clause 1, any other suitable clause, or any combination of suitable clauses, wherein the step of pulsing provides five or more portions of the pyrolysis vapor through the valve.

124. The method of clause 1, any other suitable clause, or any combination of suitable clauses, wherein the step of pulsing is configured to interface with software for programming pulsing parameters of the valve.

125. The method of clause 1, any other suitable clause, or any combination of suitable clauses, wherein the valve is configured to provide the one or more portions of pyrolysis vapor to an instrument.

126. The method of clause 125, any other suitable clause, or any combination of suitable clauses, wherein the instrument is selected from the group consisting of a gas chromatography (GC) instrument, a mass spectrometry (MS) instrument, a gas chromatography-mass spectrometry (GC-MS) instrument, a time-of-flight mass spectrometer, and an infrared (IR) analysis instrument.

127. The method of clause 1, any other suitable clause, or any combination of suitable clauses, wherein the step of analyzing is performed via gas chromatography (GC), mass spectrometry (MS), gas chromatography-mass spectrometry (GC-MS), time-of-flight mass spectrometer, infrared (IR) analysis, or any combination thereof.

128. The method of clause 1, any other suitable clause, or any combination of suitable clauses, wherein the step of analyzing is performed via a vacuum-based means of analysis.

129. The method of clause 1, any other suitable clause, or any combination of suitable clauses, wherein the one or more intermediate products are selected from the group consisting of a reactive intermediate product, a radical intermediate product, a stable intermediate product, an unstable intermediate product, an anionic intermediate product, a cationic intermediate product, and any combination thereof.

130. The method of clause 1, any other suitable clause, or any combination of suitable clauses, wherein the one or more intermediate products are selected from the group consisting of an intermediate of a pyrolysis product selected from the group consisting of 2-methyl-furan, furfural, 2-furancarboxaldehyde, 5-[hyroxymethyl], 2-methoxy-4-vinylphenol, benzene, toluene, xylene, p-xylene, benzene, 1, 2, 3-trimethyl, indene, naphthalene, naphthalene, 2-methyl, anthracene, phenol, phenol-4-methyl, azulene, and any combination thereof.

131. The method of clause 1, any other suitable clause, or any combination of suitable clauses, wherein the one or more intermediate products are indicative of one or more pyrolysis products.

132. The method of clause 131, any other suitable clause, or any combination of suitable clauses, wherein the pyrolysis products are selected from the group consisting of 2-methyl-furan, furfural, 2-furancarboxaldehyde, 5-[hyroxymethyl], 2-methoxy-4-vinylphenol, benzene, toluene, xylene, p-xylene, benzene, 1, 2, 3-trimethyl, indene, naphthalene, naphthalene, 2-methyl, anthracene, phenol, phenol-4-methyl, azulene, and any combination thereof.

133. The method of clause 131, any other suitable clause, or any combination of suitable clauses, wherein the pyrolysis product is a pyrolysis oil.

134. The method of clause 131, any other suitable clause, or any combination of suitable clauses, wherein the pyrolysis product is a liquid chemical or a liquid fuel.

135. The method of clause 1, any other suitable clause, or any combination of suitable clauses, wherein the method predicts one or more pyrolysis products based on identification of the one or more intermediate products 136. The method of clause 135, any other suitable clause, or any combination of suitable clauses, wherein the pyrolysis products are selected from the group consisting of 2-methyl-furan, furfural, 2-furancarboxaldehyde, 5-[hyroxymethyl], 2-methoxy-4-vinylphenol, benzene, toluene, xylene, p-xylene, benzene, 1, 2, 3-trimethyl, indene, naphthalene, naphthalene, 2-methyl, anthracene, phenol, phenol-4-methyl, azulene, and any combination thereof.

137. The method of clause 135, any other suitable clause, or any combination of suitable clauses, wherein the pyrolysis product is a pyrolysis oil.

138. The method of clause 135, any other suitable clause, or any combination of suitable clauses, wherein the pyrolysis product is a liquid chemical or a liquid fuel.

139. An apparatus for fast pyrolysis, said apparatus comprising i) a valve, ii) a probe rod assembly, and iii) an interface housing.

140. The apparatus of clause 139, any other suitable clause, or any combination of suitable clauses, wherein the probe rod assembly comprises a heating element.

141. The apparatus of clause 139, any other suitable clause, or any combination of suitable clauses, wherein the probe rod assembly comprises a quartz tube.

142. The apparatus of clause 139, any other suitable clause, or any combination of suitable clauses, wherein the probe rod assembly comprises a heating coil, preferably a platinum coil, a tantalum wire, a ferritic iron-chromium-aluminium alloy (FeCrAl alloy; Kanthal® A-1), or any combination thereof.

143. The apparatus of clause 139, any other suitable clause, or any combination of suitable clauses, wherein the interface housing comprises an inlet.

144. The apparatus of clause 143, any other suitable clause, or any combination of suitable clauses, wherein the inlet is an inlet for a gas.

145. The apparatus of clause 139, any other suitable clause, or any combination of suitable clauses, wherein the interface housing comprises an outlet.

146. The apparatus of clause 145, any other suitable clause, or any combination of suitable clauses, wherein the outlet is an outlet for a gas.

147. The apparatus of clause 139, any other suitable clause, or any combination of suitable clauses, wherein the valve is coupled to the probe rod assembly.

148. The apparatus of clause 139, any other suitable clause, or any combination of suitable clauses, wherein the valve is coupled to the interface housing.

149. The apparatus of clause 148, any other suitable clause, or any combination of suitable clauses, wherein the valve is positioned between the inlet and the outlet of the interface housing.

150. The apparatus of clause 139, any other suitable clause, or any combination of suitable clauses, wherein the apparatus is configured for pulsing one or more portions of pyrolysis vapor through the valve to an instrument.

151. The apparatus of clause 150, any other suitable clause, or any combination of suitable clauses, wherein the instrument is selected from the group consisting of a gas chromatography (GC) instrument, a mass spectrometry (MS) instrument, a gas chromatography-mass spectrometry (GC-MS) instrument, a time-of-flight mass spectrometer, and an infrared (IR) analysis instrument.

152. The apparatus of clause 139, any other suitable clause, or any combination of suitable clauses, wherein the valve is configured to pulse one or more portions of pyrolysis vapor through the valve.

153. The apparatus of clause 139, any other suitable clause, or any combination of suitable clauses, wherein the apparatus further comprises a second valve.

154. A pyrolysis oil prepared from an intermediate product of a fast pyrolysis reaction, wherein the intermediate product is analyzed according to the method of clause 1.

In an illustrative aspect, a method for analyzing one or more intermediate products formed via a fast pyrolysis reaction is provided. The method comprises the steps of i) performing the fast pyrolysis reaction on a solid biomass composition to produce a pyrolysis vapor; ii) pulsing one or more portions of the pyrolysis vapor through a valve; and iii) analyzing the one or more portions of the pyrolysis vapor to identify the one or more intermediate products.

In an embodiment, the fast pyrolysis reaction is performed at a temperature in a range from 100° C.-1400° C. In an embodiment, the fast pyrolysis reaction is performed at a temperature in a range from 100° C.-1000° C. In an embodiment, the fast pyrolysis reaction is performed at a temperature in a range from 200° C.-900° C. In an embodiment, the fast pyrolysis reaction is performed at a temperature in a range from 300° C.-800° C.

In an embodiment, the fast pyrolysis reaction is performed at a temperature in a range from 200° C.-400° C. In an embodiment, the fast pyrolysis reaction is performed at a temperature in a range from 200° C.-300° C. In an embodiment, the fast pyrolysis reaction is performed at a temperature in a range from 300° C.-400° C. In an embodiment, the fast pyrolysis reaction is performed at a temperature in a range from 400° C.-600° C. In an embodiment, the fast pyrolysis reaction is performed at a temperature greater than 400° C. In an embodiment, the fast pyrolysis reaction is performed at a temperature in a range from 400° C.-500° C. In an embodiment, the fast pyrolysis reaction is performed at a temperature in a range from 500° C.-600° C. In an embodiment, the fast pyrolysis reaction is performed at a temperature in a range from 600° C.-800° C. In an embodiment, the fast pyrolysis reaction is performed at a temperature in a range from 600° C.-700° C. In an embodiment, the fast pyrolysis reaction is performed at a temperature in a range from 700° C.-800° C. In an embodiment, the fast pyrolysis reaction is performed at a temperature in a range from 800° C.-1000° C. In an embodiment, the fast pyrolysis reaction is performed at a temperature in a range from 800° C.-900° C. In an embodiment, the fast pyrolysis reaction is performed at a temperature in a range from 900° C.-1000° C.

In an embodiment, the fast pyrolysis reaction is performed at a heating rate of 5° C. per millisecond (ms). In an embodiment, the fast pyrolysis reaction is performed at a heating rate of 10° C. per millisecond (ms). In an embodiment, the fast pyrolysis reaction is performed at a heating rate of 15° C. per millisecond (ms). In an embodiment, the fast pyrolysis reaction is performed at a heating rate of less than 10° C. per millisecond (ms). In an embodiment, the fast pyrolysis reaction is performed at a heating rate of greater than 10° C. per millisecond (ms). In an embodiment, the fast pyrolysis reaction is performed at a heating rate between 0.01° C. per ms and 20° C. per ms. In an embodiment, the fast pyrolysis reaction is performed at a heating rate between 1° C. per ms and 20° C. per ms. In an embodiment, the fast pyrolysis reaction is performed at a heating rate greater than 0.5° C. per ms. In an embodiment, the fast pyrolysis reaction is performed at a heating rate between 1° C. per ms and 10° C. per ms. In an embodiment, the fast pyrolysis reaction is performed at a heating rate between 5° C. per ms and 15° C. per ms.

The duration of the fast pyrolysis reaction has two components to consider. First, the duration should consider pyrolysis time, for instance the amount of time for which the solid biomass composition will be exposed to high temperatures (e.g., >400° C.) within the reactor. In an embodiment, the pyrolysis time is between 1 second to 10 seconds. In an embodiment, the pyrolysis time is between 1 second to 2 seconds. In an embodiment, the pyrolysis time is between 1 second to 3 seconds. In an embodiment, the pyrolysis time is between 1 second to 4 seconds. In an embodiment, the pyrolysis time is between 1 second to 5 seconds. In an embodiment, the pyrolysis time is between 1 second to 6 seconds. In an embodiment, the pyrolysis time is between 1 second to 7 seconds. In an embodiment, the pyrolysis time is between 1 second to 8 seconds. In an embodiment, the pyrolysis time is between 1 second to 9 seconds.

Second, the duration should consider residence time, for instance the time spent by the gas-phase pyrolysis products in the reactor. In an embodiment, the residence time is between 1 to 1000 milliseconds (ms). In an embodiment, the residence time is between 1 to 500 milliseconds (ms). In an embodiment, the residence time is between 100 to 200 milliseconds (ms). In an embodiment, the residence time is between 200 to 300 milliseconds (ms). In an embodiment, the residence time is between 300 to 400 milliseconds (ms). In an embodiment, the residence time is between 400 to 500 milliseconds (ms). In an embodiment, the residence time is between 500 to 600 milliseconds (ms). In an embodiment, the residence time is between 600 to 700 milliseconds (ms). In an embodiment, the residence time is between 700 to 800 milliseconds (ms). In an embodiment, the residence time is between 800 to 900 milliseconds (ms). In an embodiment, the residence time is between 900 to 1000 milliseconds (ms). In an embodiment, the residence time is 180 milliseconds (ms).

In an embodiment, the fast pyrolysis reaction is performed for a duration in a range from 0.1 seconds to 1 second. In an embodiment, the fast pyrolysis reaction is performed for a duration in a range from 1 second to 2 seconds. In an embodiment, the fast pyrolysis reaction is performed for a duration in a range from 1 second to 3 seconds. In an embodiment, the fast pyrolysis reaction is performed for a duration in a range from 1 second to 4 seconds. In an embodiment, the fast pyrolysis reaction is performed for a duration in a range from 1 second to 5 seconds. In an embodiment, the fast pyrolysis reaction is performed for a duration in a range from 2 second to 5 seconds. In an embodiment, the fast pyrolysis reaction is performed for a duration in a range from 3 second to 5 seconds. In an embodiment, the fast pyrolysis reaction is performed for a duration in a range from 4 second to 5 seconds.

In an embodiment, the fast pyrolysis reaction is performed for a duration of about 0.001 seconds. In an embodiment, the fast pyrolysis reaction is performed for a duration of about 0.005 seconds. In an embodiment, the fast pyrolysis reaction is performed for a duration of about 0.01 seconds. In an embodiment, the fast pyrolysis reaction is performed for a duration of about 0.05 seconds. In an embodiment, the fast pyrolysis reaction is performed for a duration of about 0.1 seconds. In an embodiment, the fast pyrolysis reaction is performed for a duration of about 0.5 seconds.

In an embodiment, the fast pyrolysis reaction is performed for a duration of about 1 second. In an embodiment, the fast pyrolysis reaction is performed for a duration of about 2 seconds. In an embodiment, the fast pyrolysis reaction is performed for a duration of about 3 seconds. In an embodiment, the fast pyrolysis reaction is performed for a duration of about 4 seconds. In an embodiment, the fast pyrolysis reaction is performed for a duration of about 5 seconds.

In an embodiment, the solid biomass composition comprises agricultural waste. In an embodiment, the solid biomass composition comprises agricultural process waste. In an embodiment, the solid biomass composition comprises fruit pits. In an embodiment, the solid biomass composition comprises corn cobs. In an embodiment, the solid biomass composition comprises straw.

In an embodiment, the solid biomass composition comprises wood. In an embodiment, the solid biomass composition comprises wood chips. In an embodiment, the solid biomass composition comprises wood logs. In an embodiment, the solid biomass composition comprises bark. In an embodiment, the solid biomass composition comprises sawdust.

In an embodiment, the solid biomass composition comprises solid waste. In an embodiment, the solid biomass composition comprises feedstock. In an embodiment, the solid biomass composition comprises food processing waste. In an embodiment, the solid biomass composition comprises industrial residue. In an embodiment, the solid biomass composition comprises residential residue.

In an embodiment, the solid biomass composition comprises citrus waste.

In an embodiment, the solid biomass composition is present at a particle size of less than 1000 micrometers. In an embodiment, the solid biomass composition is present at a particle size of less than 100 micrometers.

In an embodiment, the solid biomass composition comprises a catalyst. For instance, the solid biomass composition and the catalyst can be present as compartments that are adjacent to each other or the solid composition and the catalyst can be combined in a single compartment. In an embodiment, the catalyst is selected from the group consisting of a zeolite, a metal oxide catalyst, a heterogeneous catalyst, and any combination thereof. Generally, a person of ordinary skill in the art can determine the heterogeneous catalyst that can effectuate the desired transformation of the crude pyrolysis products to a desired product(s). In an embodiment, the catalyst is a zeolite. In an embodiment, the solid biomass composition does not comprise a catalyst.

In an embodiment, the valve is coupled to a probe rod assembly. In an embodiment, the probe rod assembly comprises a heating element. In an embodiment, the probe rod assembly comprises a quartz tube. In an embodiment, the probe rod assembly comprises a heating coil. For instance, the heating coil can comprise any suitable material for heating at high rates and achieving high temperatures. In an embodiment, the heating coil is a platinum coil. In an embodiment, the heating coil is a tantalum wire. In an embodiment, the heating coil is a platinum wire. In an embodiment, the heating coil is a tantalum coil. In an embodiment, the heating coil is a ferritic iron-chromium-aluminium alloy (FeCrAl alloy; Kanthal® A-1). In an embodiment, the probe rod assembly is configured to have a residence time between 50-100 ms.

In an embodiment, the valve is coupled to an interface housing. In an embodiment, the interface housing comprises an inlet. In an embodiment, the inlet is an inlet for a gas. In an embodiment, the gas is an inert gas to the reaction environment. In an embodiment, the gas is a noble gas. In an embodiment, the gas is neon. In an embodiment, the gas is argon. In an embodiment, the gas is krypton. In an embodiment, the gas is nitrogen. In an embodiment, the gas is helium.

In an embodiment, the inlet is configured to have a flow rate of 1 ml/min to about 1000 ml/min. In an embodiment, the inlet is configured to have a flow rate of 10 ml/min to about 1000 ml/min. In an embodiment, the inlet is configured to have a flow rate of 100 ml/min to about 1000 ml/min. In an embodiment, the inlet is configured to have a flow rate of 1 ml/min to about 100 ml/min. In an embodiment, the inlet is configured to have a flow rate of 100 ml/min to about 200 ml/min. In an embodiment, the inlet is configured to have a flow of about 280 ml/minute. In an embodiment, the inlet is configured to have a flow rate of 200 ml/min to about 300 ml/min. In an embodiment, the inlet is configured to have a flow rate of 300 ml/min to about 400 ml/min. In an embodiment, the inlet is configured to have a flow rate of 400 ml/min to about 500 ml/min. In an embodiment, the inlet is configured to have a flow rate of 500 ml/min to about 600 ml/min. In an embodiment, the inlet is configured to have a flow rate of 600 ml/min to about 700 ml/min. In an embodiment, the inlet is configured to have a flow rate of 700 ml/min to about 800 ml/min. In an embodiment, the inlet is configured to have a flow rate of 800 ml/min to about 900 ml/min. In an embodiment, the inlet is configured to have a flow rate of 900 ml/min to about 1000 ml/min.

In an embodiment, the interface housing comprises an outlet. In an embodiment, the outlet is an outlet for a gas. In an embodiment, the gas is an inert gas to the reaction environment. In an embodiment, the gas is a noble gas. In an embodiment, the gas is neon. In an embodiment, the gas is argon. In an embodiment, the gas is krypton. In an embodiment, the gas is nitrogen. In an embodiment, the gas is helium. In an embodiment, the gas is a binary or multicomponent mixture of one or more noble gases. For a given application, a person of ordinary skill in the art can determine the composition of the gas (e.g., a pure gas composition, a binary gas composition, a multicomponent mixture of gases, and the like). In an embodiment, the outlet is configured to have a pressure of between 400-760 torr.

In an embodiment, the valve is positioned between the inlet and the outlet of the interface housing.

In an embodiment, the step of pulsing is performed one time. In an embodiment, the step of pulsing is performed two times. In an embodiment, the step of pulsing is performed three times. In an embodiment, the step of pulsing is performed four times. In an embodiment, the step of pulsing is performed five or more times. For instance when the step of pulsing is performed more than once, it may be referred to as "cycled" pulsing.

In an embodiment, the step of pulsing is performed at a duration of between 0.01 millisecond and 1000 milliseconds. In an embodiment, the step of pulsing is performed at a duration of between 0.1 millisecond and 1000 milliseconds. In an embodiment, the step of pulsing is performed at a duration of between 1 millisecond and 1000 milliseconds. In an embodiment, the step of pulsing is performed at a duration of between 10 milliseconds and 1000 milliseconds.

In an embodiment, the step of pulsing is performed at a duration of between 0.01 millisecond and 1 millisecond. In an embodiment, the step of pulsing is performed at a duration of between 0.01 millisecond and 0.1 millisecond. In an embodiment, the step of pulsing is performed at a duration of between 0.1 millisecond and 1 millisecond.

In an embodiment, the step of pulsing is performed at a duration of between 10 milliseconds and 100 milliseconds. In an embodiment, the step of pulsing is performed at a duration of between 100 milliseconds and 200 milliseconds. In an embodiment, the step of pulsing is performed at a duration of between 200 milliseconds and 300 milliseconds. In an embodiment, the step of pulsing is performed at a duration of between 300 milliseconds and 400 milliseconds. In an embodiment, the step of pulsing is performed at a duration of between 400 milliseconds and 500 milliseconds. In an embodiment, the step of pulsing is performed at a duration of between 100 milliseconds and 500 milliseconds. In an embodiment, the step of pulsing is performed at a duration of between 500 milliseconds and 1000 milliseconds.

In an embodiment, the step of pulsing is performed at a duration of about 1 millisecond. In an embodiment, the step of pulsing is performed at a duration of about 10 milliseconds. In an embodiment, the step of pulsing is performed at a duration of about 50 milliseconds. In an embodiment, the step of pulsing is performed at a duration of about 100 milliseconds. In an embodiment, the step of pulsing is performed at a duration of about 200 milliseconds. In an embodiment, the step of pulsing is performed at a duration of about 300 milliseconds. In an embodiment, the step of pulsing is performed at a duration of about 400 milliseconds. In an embodiment, the step of pulsing is performed at a duration of about 500 milliseconds. In an embodiment, the step of pulsing is performed at a duration of about 600 milliseconds. In an embodiment, the step of pulsing is performed at a duration of about 700 milliseconds. In an embodiment, the step of pulsing is performed at a duration of about 800 milliseconds. In an embodiment, the step of pulsing is performed at a duration of about 900 milliseconds. In an embodiment, the step of pulsing is performed at a duration of about 1000 milliseconds.

In an embodiment, the step of pulsing is performed at a repetition rate of greater than 10 pulses within 5 seconds. In an embodiment, the step of pulsing is performed at a repetition rate of greater than 100 pulses within 5 seconds.

In an embodiment, the step of pulsing is performed at a repetition rate of greater than 10 pulses within 1 second. In an embodiment, the step of pulsing is performed at a repetition rate of greater than 100 pulses within 1 second. In an embodiment, the step of pulsing is performed at a repetition rate of greater than 1000 pulses within 1 second. In an embodiment, the step of pulsing is performed at a repetition rate of between 200-1000 pulses per second.

In an embodiment, the step of pulsing is performed at a repetition rate of greater than 100 pulses within 2 seconds. In an embodiment, the step of pulsing is performed at a repetition rate of greater than 100 pulses within 3 seconds. In an embodiment, the step of pulsing is performed at a repetition rate of greater than 100 pulses within 4 seconds. In an embodiment, the step of pulsing is performed at a repetition rate of greater than 100 pulses within 5 seconds.

In an embodiment, the step of pulsing provides one portion of the pyrolysis vapor through the valve. In an embodiment, the step of pulsing provides two portions of the pyrolysis vapor through the valve. In an embodiment, the step of pulsing provides three portions of the pyrolysis vapor through the valve. In an embodiment, the step of pulsing provides four portions of the pyrolysis vapor through the valve. In an embodiment, the step of pulsing provides five or more portions of the pyrolysis vapor through the valve.

In an embodiment, the step of pulsing is configured to interface with software for programming pulsing parameters of the valve. In an embodiment, the step of pulsing is configured to interface with computer hardware for programming pulsing parameters of the valve. In an embodiment, the interface is configured so the step of pulsing can interface to the instrument used for detection of the pyrolysis products (e.g., a mass spectrometer). In an embodiment, the interface is configured so the step of pulsing can interface to the instrument used for a data collection system to provide millisecond or sub-millisecond time resolution.

In an embodiment, the valve is configured to provide the one or more portions of pyrolysis vapor to an instrument. In an embodiment, the instrument is selected from the group consisting of a gas chromatography (GC) instrument, a mass spectrometry (MS) instrument, a gas chromatography-mass spectrometry (GC-MS) instrument, a time-of-flight mass spectrometer, and an infrared (IR) analysis instrument.

In an embodiment, the step of analyzing is performed via gas chromatography (GC), mass spectrometry (MS), gas chromatography-mass spectrometry (GC-MS), time-of-flight mass spectrometer, infrared (IR) analysis, or any combination thereof. In an embodiment, the step of analyzing is performed via a vacuum-based means of analysis.

In an embodiment, the one or more intermediate products are selected from the group consisting of a reactive intermediate product, a radical intermediate product, a stable intermediate product, an unstable intermediate product, an anionic intermediate product, a cationic intermediate product, and any combination thereof. The various categories of intermediate products are well known to a person of ordinary skill in the art.

In an embodiment, the one or more intermediate products are selected from the group consisting of an intermediate of a pyrolysis product selected from the group consisting of 2-methyl-furan, furfural, 2-furancarboxaldehyde, 5-[hyroxymethyl], 2-methoxy-4-vinylphenol, benzene, toluene, xylene, p-xylene, benzene, 1, 2, 3-trimethyl, indene, naphthalene, naphthalene, 2-methyl, anthracene, phenol, phenol-4-methyl, azulene, and any combination thereof.

In an embodiment, the one or more intermediate products are indicative of one or more pyrolysis products. In an embodiment, the pyrolysis products are selected from the group consisting of 2-methyl-furan, furfural, 2-furancarboxaldehyde, 5-[hyroxymethyl], 2-methoxy-4-vinylphenol, benzene, toluene, xylene, p-xylene, benzene, 1, 2, 3-trimethyl, indene, naphthalene, naphthalene, 2-methyl, anthracene, phenol, phenol-4-methyl, azulene, and any combination thereof.

In an embodiment, the pyrolysis product is a pyrolysis oil. In an embodiment, the pyrolysis product is a liquid chemical. In an embodiment, the pyrolysis product is a liquid fuel.

In an embodiment, the method predicts one or more pyrolysis products based on identification of the one or more intermediate products. In an embodiment, the pyrolysis products are selected from the group consisting of 2-methyl-furan, furfural, 2-furancarboxaldehyde, 5-[hyroxymethyl], 2-methoxy-4-vinylphenol, benzene, toluene, xylene, p-xylene, benzene, 1, 2, 3-trimethyl, indene, naphthalene, naphthalene, 2-methyl, anthracene, phenol, phenol-4-methyl, azulene, and any combination thereof. In an embodiment, the pyrolysis product is a pyrolysis oil. In an embodiment, the pyrolysis product is a liquid chemical. In an embodiment, the pyrolysis product is a liquid fuel.

In an embodiment, the solid biomass composition is present at a particle size of between 1 micrometer to 2000 micrometers. In an embodiment, the solid biomass composition is present at a particle size of between 1 micrometer to 1000 micrometers. In an embodiment, the solid biomass composition is present at a particle size of between 1 micrometer to 100 micrometers. In an embodiment, the solid biomass composition is present at a particle size of between 10 micrometer to 100 micrometers. Furthermore, it is contemplated that the solid biomass composition can comprise a distribution of particle sizes, wherein the mean particle size in the distribution is within a range or a value of particle sizes described herein.

In an illustrative aspect, an apparatus for fast pyrolysis is provided. The apparatus comprises i) a valve, ii) a probe rod assembly, and iii) an interface housing.

In an embodiment, the probe rod assembly comprises a heating element. In an embodiment, the probe rod assembly comprises a quartz tube. In an embodiment, the probe rod assembly comprises a heating coil. For instance, the heating coil can comprise any suitable material for heating at high rates and achieving high temperatures. In an embodiment, the heating coil is a platinum coil. In an embodiment, the heating coil is a tantalum wire. In an embodiment, the heating coil is a platinum wire. In an embodiment, the heating coil is a tantalum coil. In an embodiment, the heating coil is a ferritic iron-chromium-aluminium alloy (FeCrAl alloy; Kanthal® A-1).

In an embodiment, the interface housing comprises an inlet. In an embodiment, the inlet is a helium inlet. In an embodiment, the interface housing comprises an outlet. In an embodiment, the outlet is a helium outlet.

In an embodiment, the valve is coupled to the probe rod assembly. In an embodiment, the valve is coupled to the interface housing. In an embodiment, the valve is positioned between the inlet and the outlet of the interface housing.

In an embodiment, the apparatus is configured for pulsing one or more portions of pyrolysis vapor through the valve to an instrument. The descriptions of the method for analyzing one or more intermediate products formed via a fast pyrolysis reaction as described herein are also applicable to the apparatus. In an embodiment, the instrument is selected from the group consisting of a gas chromatography (GC) instrument, a mass spectrometry (MS) instrument, a gas chromatography-mass spectrometry (GC-MS) instrument, a time-of-flight mass spectrometer, and an infrared (IR) analysis instrument.

In an embodiment, the valve is configured to pulse one or more portions of pyrolysis vapor through the valve. Preferably, the pyrolysis vapor exits the valve to pass into a vacuum in order to minimize the incidence of gas-gas collisions that take place. In an embodiment, the apparatus further comprises a second valve.

In an illustrative aspect, a pyrolysis oil prepared from an intermediate product of a fast pyrolysis reaction is provided, wherein the intermediate product is analyzed according to the described methods of the present disclosure. For instance, the pyrolysis oil can be utilized as a liquid chemical and/or a liquid fuel.

EXAMPLES

Example 1

Apparatus Configuration

Figure 2:
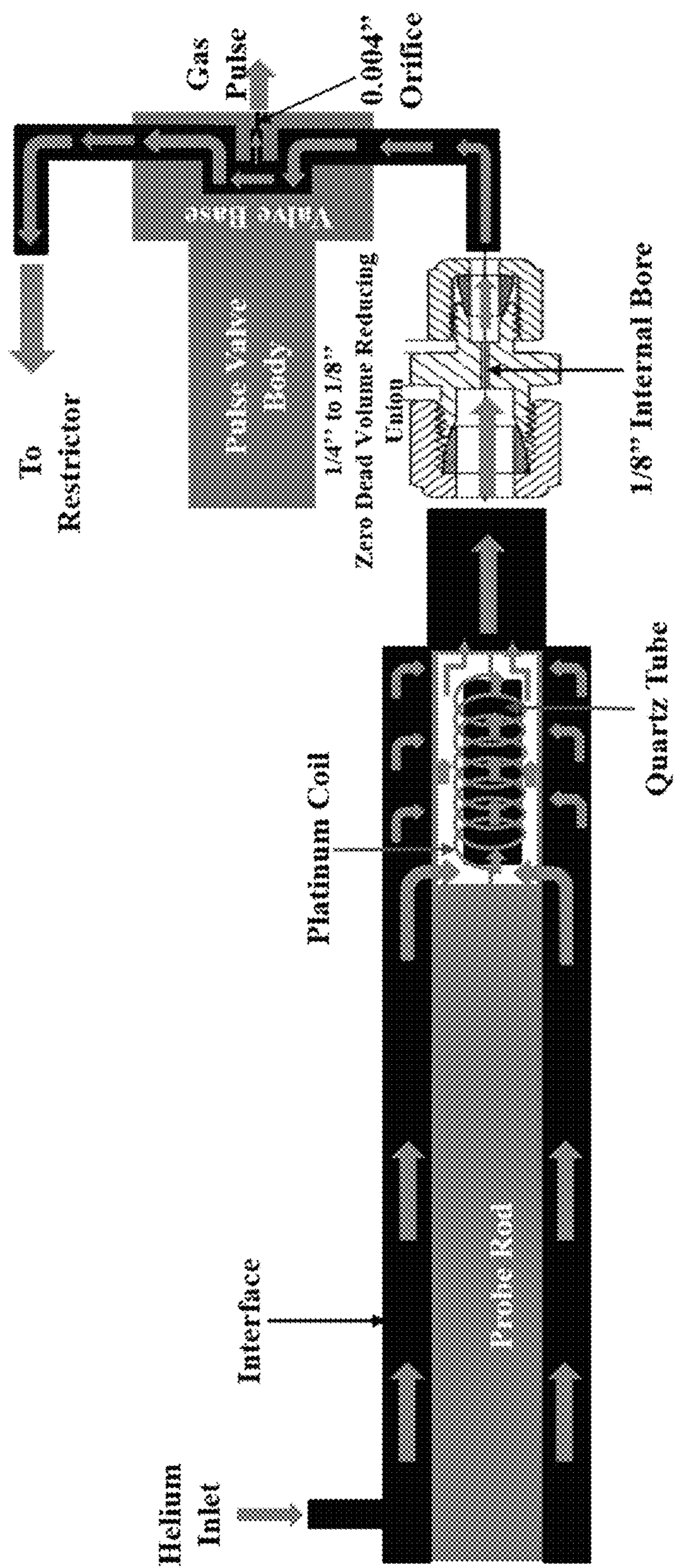
Figure 3A:
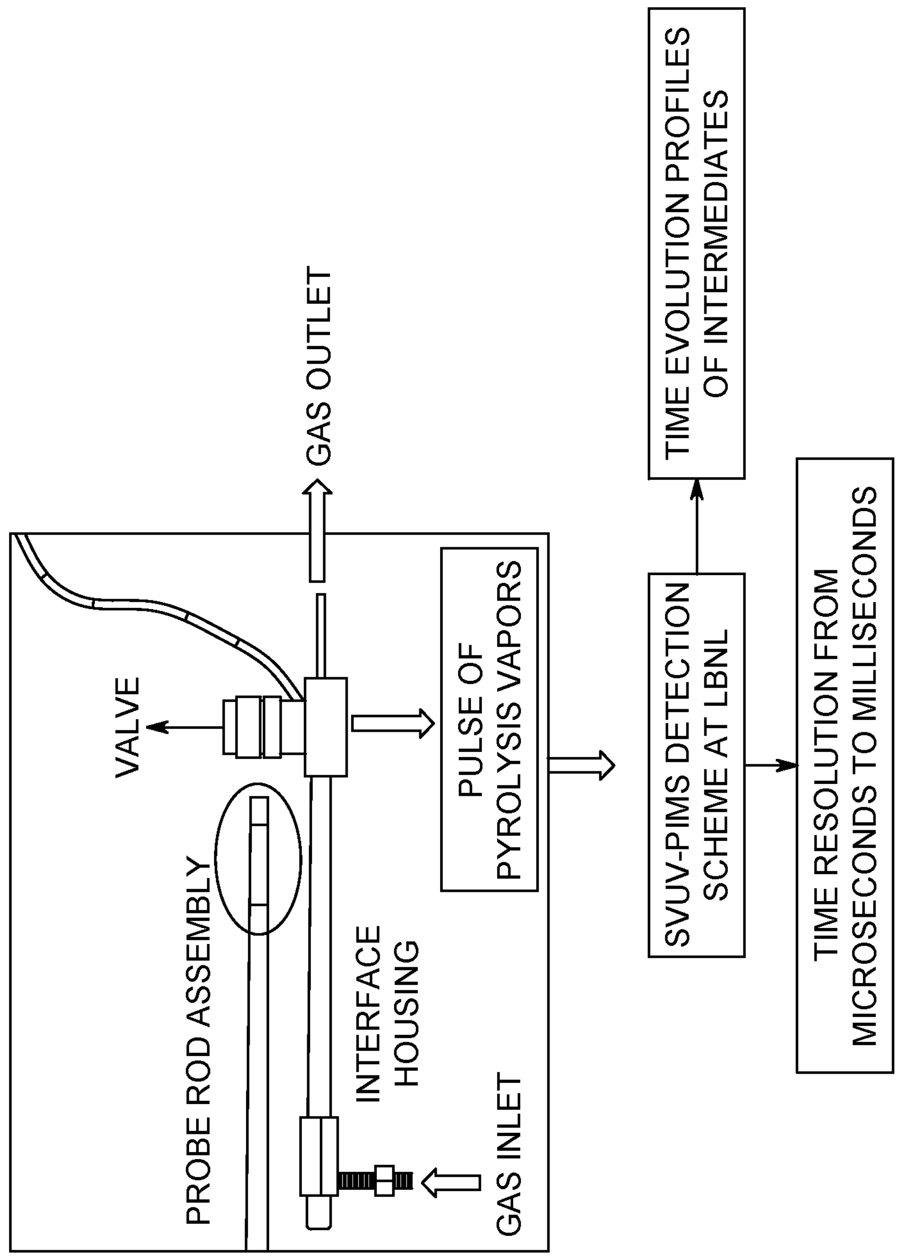
Figure 3B:
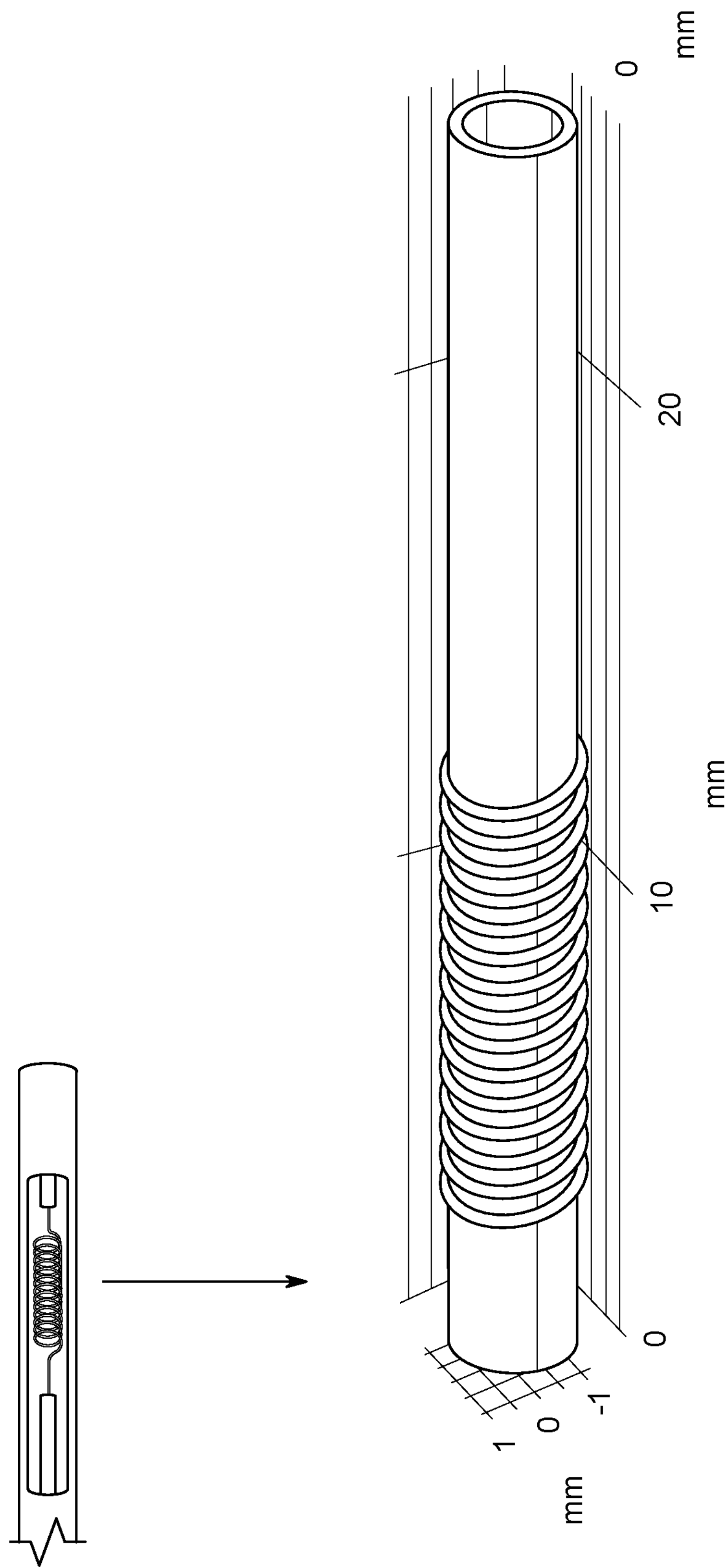
Figure 4:
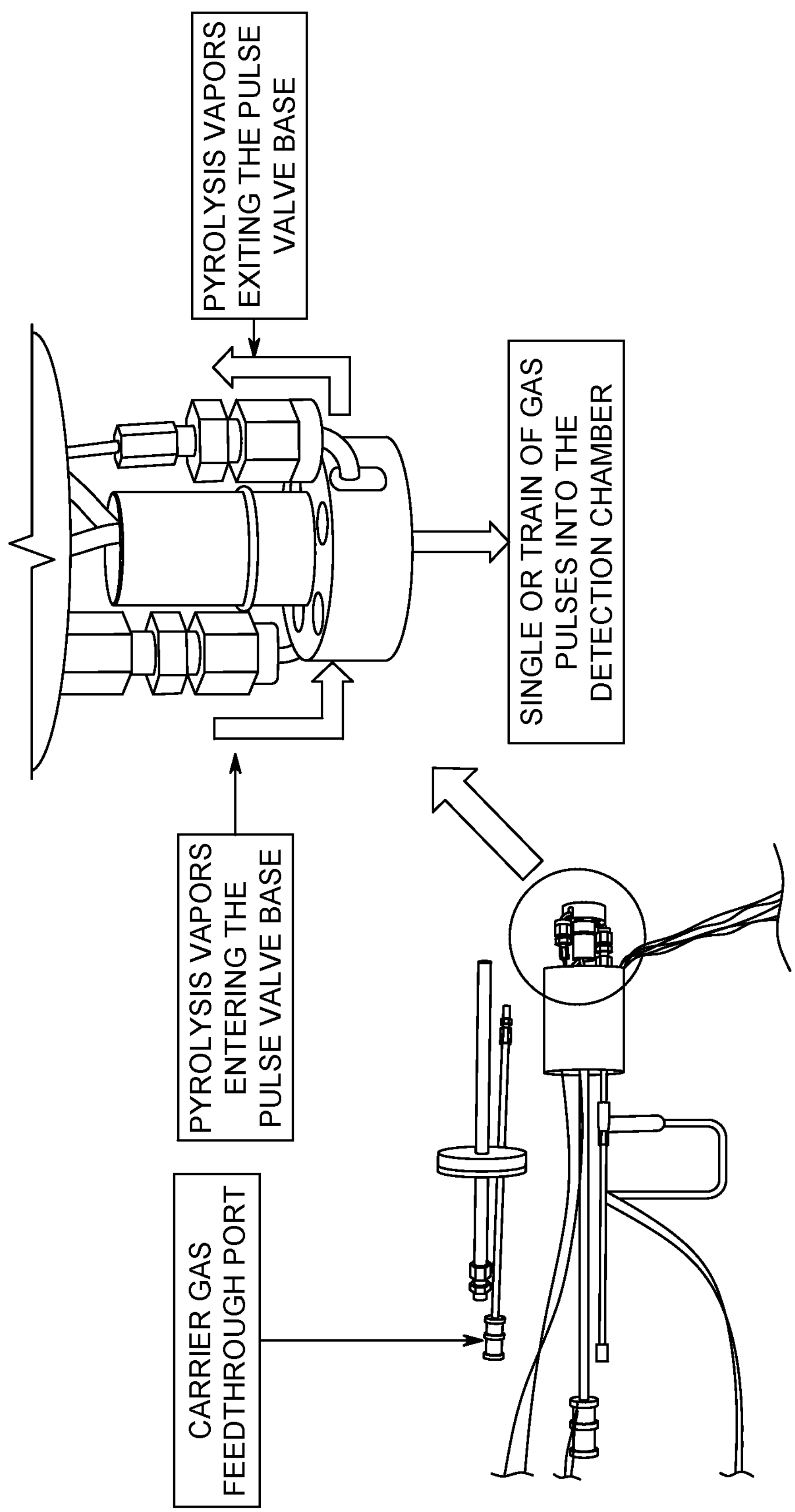
Figure 5:
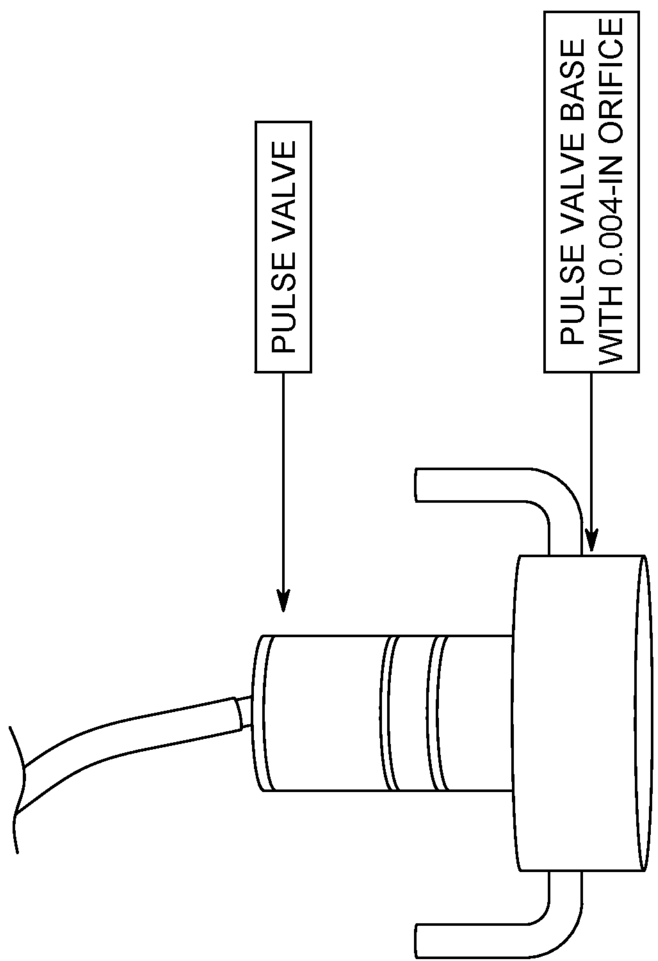
Figure 6:
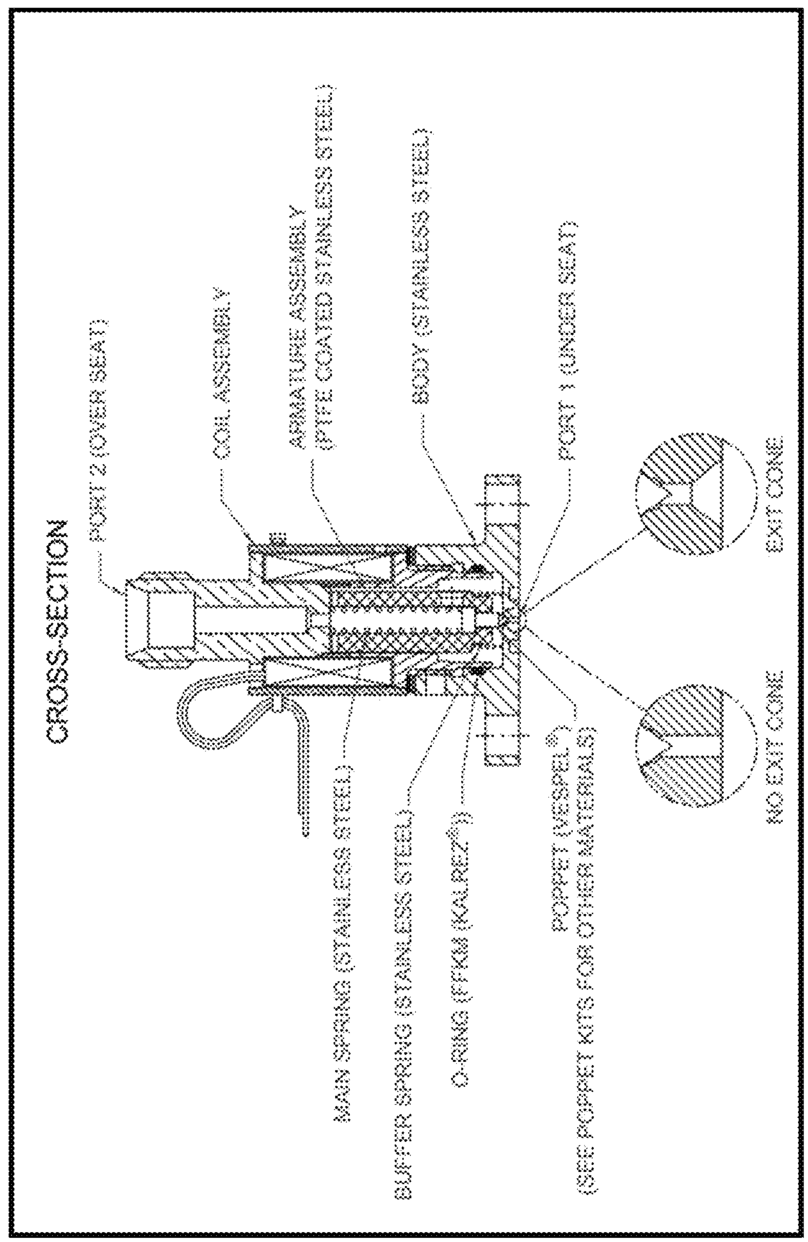

An exemplary apparatus for fast pyrolysis according to the present disclosure is provided in FIGS. 2 and 3A-3B. For instance, the apparatus comprises i) a valve, ii) a probe rod assembly, and iii) an interface housing. As shown in FIG. 2 and FIG. 3A, the valve can be positioned between the probe rod assembly and the interface housing. The valve can be configured to interface with a computer hardware and/or software in order to program the valve with pulsing parameters. For example, the valve can be programed to i) pulse one or more times; ii) pulse at various durations of time; iii) pulse at various rates of repetition, and/or iv) pulse to release one or more portions of pyrolysis vapor through the valve. As shown in FIG. 3A and FIG. 4, the pulse of pyrolysis vapors can flow through the valve for analysis of a connected instrument (e.g., a mass spectrometer) in order for analysis of the intermediate products and identification of pyrolysis products.

Example 2

Fast Pyrolysis of Citrus Waste Solid Biomass Compositions

Figure 7:
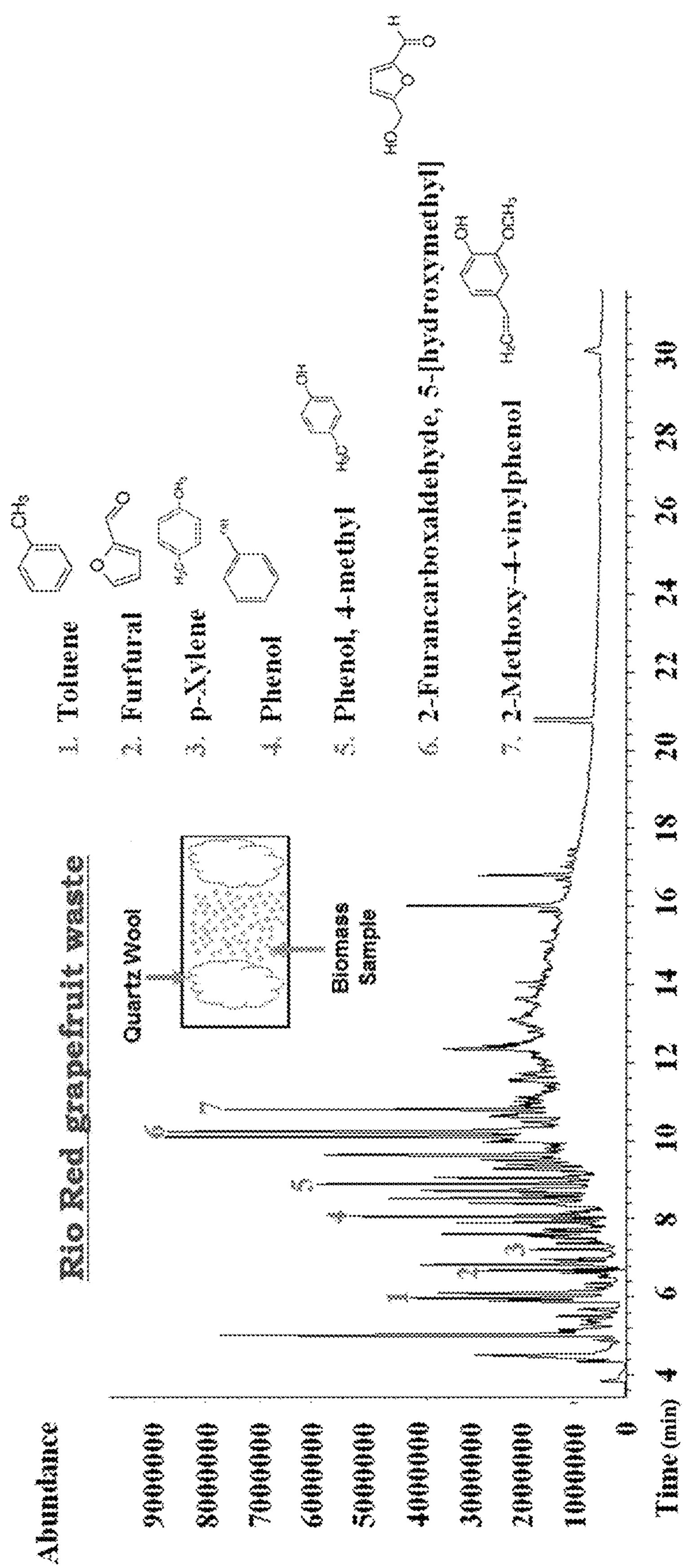
Figure 8:
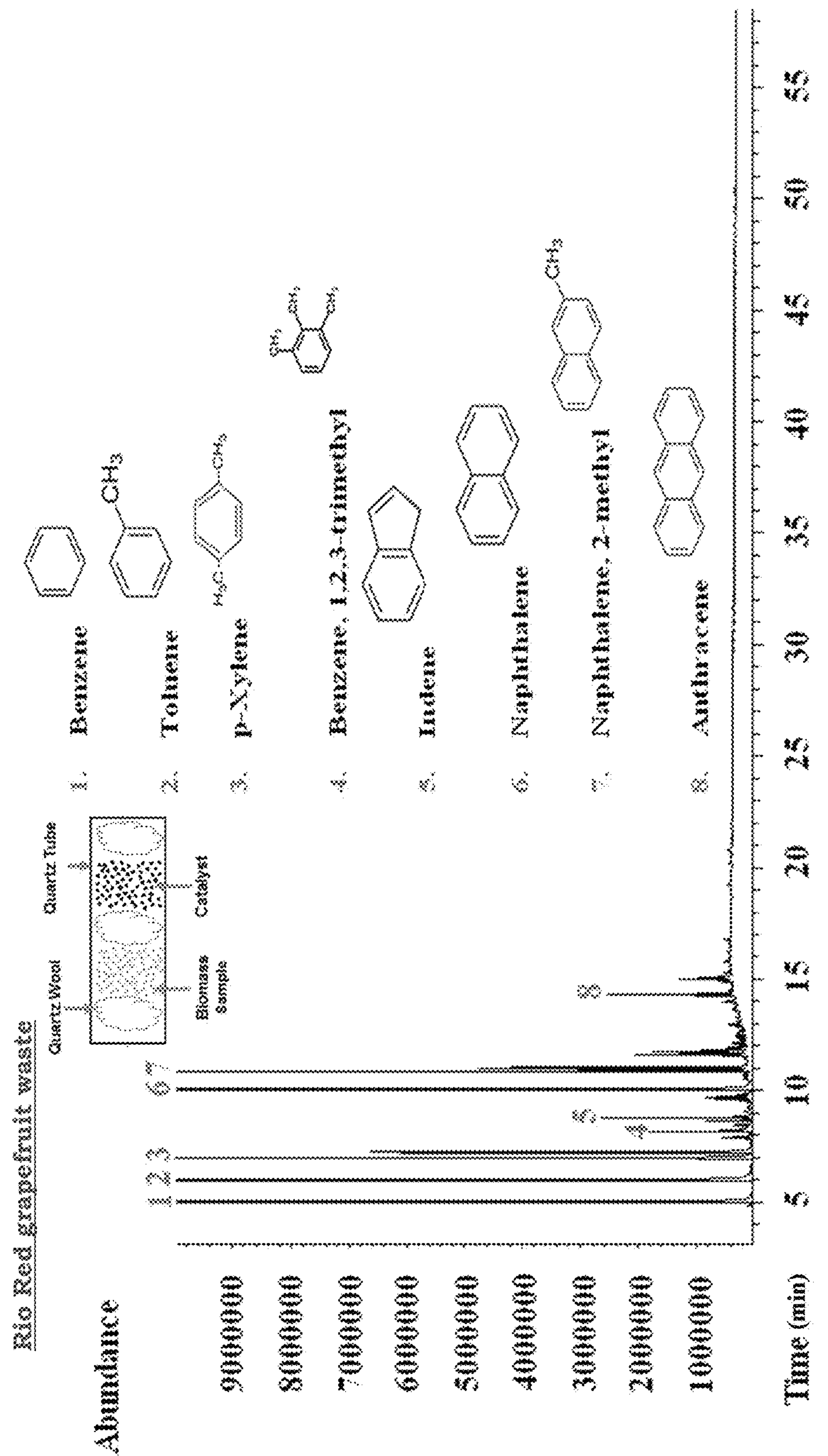
Figure 9:
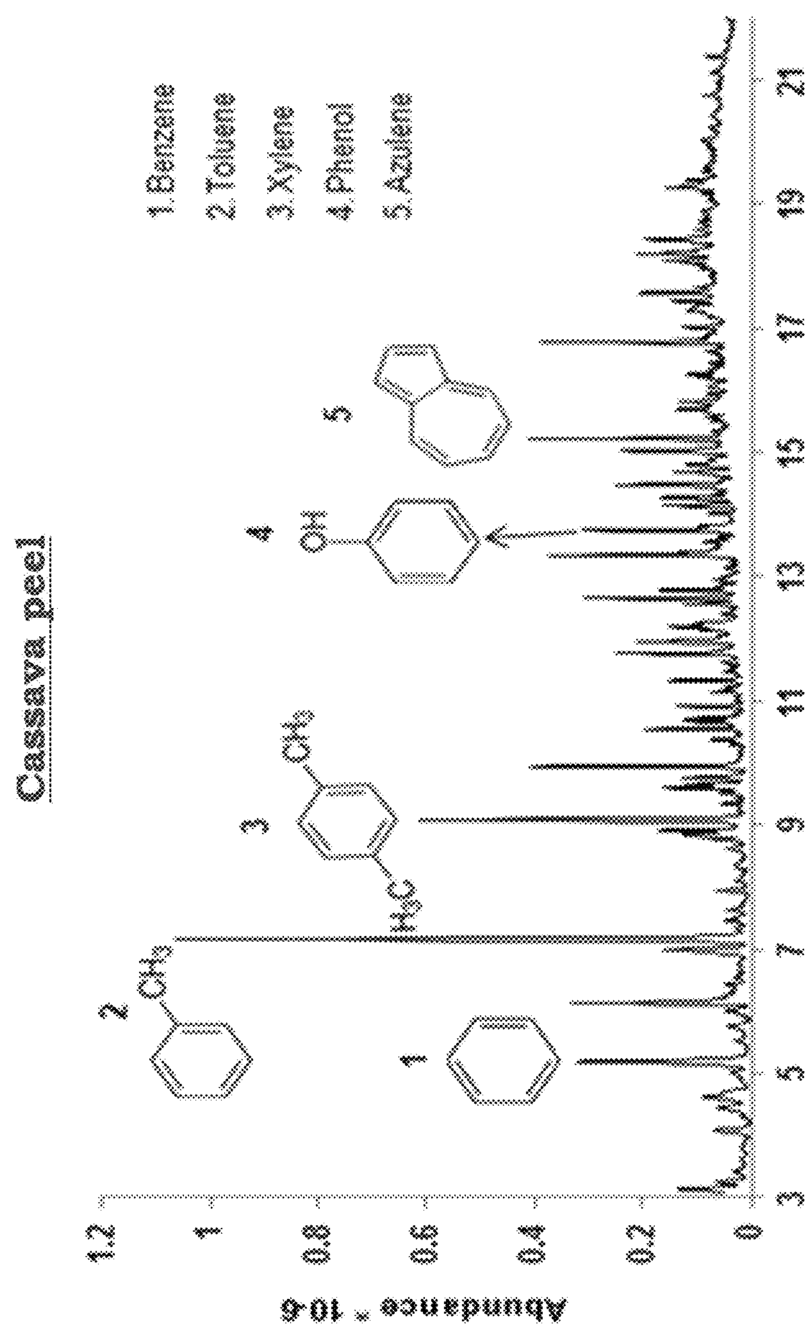

A CDS Analytical 5200 series coil-type pyroprobe (CDS Analytical, Oxford, PA) interfaced with a 6890 Agilent GC was used to perform the non-catalytic and catalytic fast pyrolysis experiments of GPW and Cassava peel. In the case of non-catalytic fast pyrolysis experiments, a small amount of biomass sample was placed between quartz wool layers in a quartz tube. In the case of catalytic fast pyrolysis experiments, a small amount of catalyst was placed above the biomass sample in a quartz tube. The pyroprobe was operated in trap mode. The GC was equipped with an Agilent model 5973 mass selective detector (MSD) qualitative analysis of the pyrolysis vapors. The pyrolysis conditions and the GC method parameters are provided in Table 1. Data are shown in FIGS. 7, 8, and 9.

TABLE 1

| Pyrolysis conditions and GC method parameters. | |
|---|---|
| **Pyrolysis Conditions** | |
| Pyrolysis Temperature (° C.) | 600 |
| Heating Rate (° C./ms) | 10 |
| Pyrolysis Time (s) | 10 |
| Transfer Line Temperature (° C.) | 315 |
| **GC Parameters** | |
| Inlet | Back (Split/Splitless) |
| Carrier Gas | He |
| Column | DB-5 (L = 60 m, ID = 0.32 mm, & Film = 1 μm) |
| Injector Temperature (° C.) | 315 |
| Split ratio | 1:50 |
| Program | Constant Flow |
| Column Flow Rate (ml/min) | 1.5 |
| Oven Temperature (° C.) | 315 |

Example 3

Pulse Intensity Experiments with Inert Gas Flow

The instant example can identify the required pulse width that produces gas concentrations falling within the sensitivity range of the instrument connected to the apparatus. In this example, an inert gas can be utilized as the test gas. A similar approach can used for other methods of detecting gas species present in the pyrolysis products from a fast pyrolysis reaction.

Figure 10:
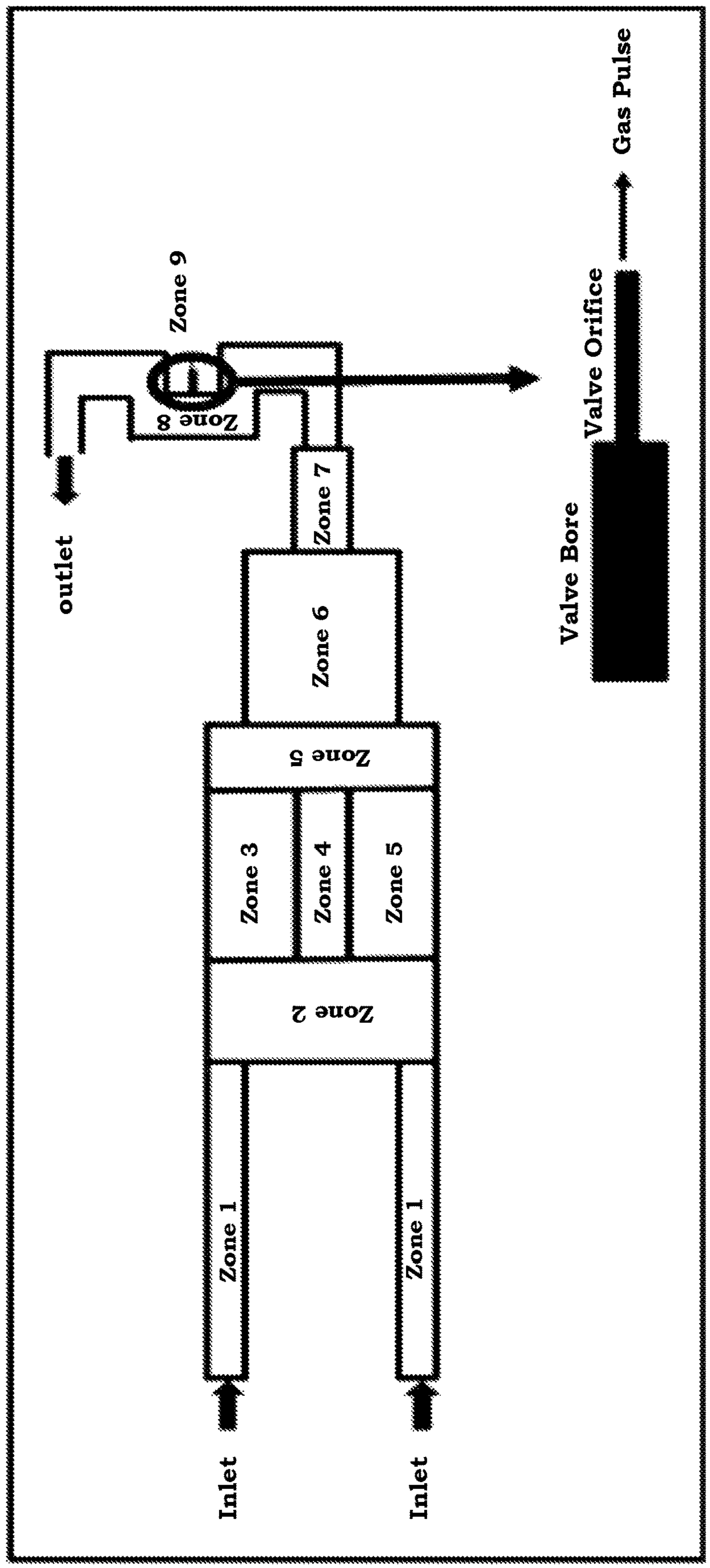
FIG. 10 shows the simplified geometry of the modified pyroprobe design and the pulse valve that can be in Examples 3-7.

The apparatus can be interfaced with a synchrotron-based vacuum ultraviolet photoionization mass spectroscopy (SVUV-PIMS) instrument. For instance, an SVUV-PIMS instrument can be found at Lawrence Berkeley National Laboratory (LBNL), USA. As shown in FIG. 10, the simplified geometry of the apparatus illustrates the flow path of carrier gas segregated into multiple zones. Information regarding the zones is provided in Tables 2 and 3, where Kn denotes the Knudsen number.

TABLE 2

Location of the flow zones in the apparatus and the flow regime in the zones.

| Zone | Location | Flow Regime |
|---|---|---|
| Zone 1 | Annulus Region | Continuum |
| Zone 2 | Between probe rod and quartz tube | ($Kn \leq 10^{-3}$) |
| Zone 3 | Between interface housing and quartz tube | |
| Zone 4 | Quartz tube | |
| Zone 5 | Between interface housing outlet and quartz tube | |
| Zone 6 | Interface stem | |
| Zone 7 | Internal bore in the union fitting | |
| Zone 8 | Pulse valve base | |
| Zone 9 | Internal bore & 0.004" Orifice | Free Molecular ($Kn \geq 10$) |

TABLE 3

Dimensions of the flow zones in the apparatus.

| Zone | Dimensions, mm |
|---|---|
| Zone 1 | L = 138.05, ID = 6.35 & OD = 7.21 |
| Zone 2 | L = 9.8 & D = 7.21 |
| Zone 3 | L = 25.4 & D = 2.56 |
| Zone 4 | L = 25.4 & D = 1.6 |
| Zone 5 | L = 2.37 & D = 7.21 |
| Zone 6 | L = 18.9 & D = 4.24 |

TABLE 3-continued

| Dimensions of the flow zones in the apparatus. | |
|---|---|
| Zone | Dimensions, mm |
| Zone 7 | L = 10.16 & D = 3.17 |
| Zone 8 | D = 1.397 |
| Zone 9 | D = 0.101 |

A flow restrictor (e.g., 0.25 mm i.d. SS capillary tubing) can be used on the outlet side of the pulse valve in order to maintain and control the pressure within the pyroprobe interface. The exemplary length of the restrictor to produce an outlet pressure range of 400 to 760 torr is shown in Table 4. The length can be evaluated using fundamental relations for gasflow in capillary tubes. The function of the restrictor is to maintain the flow within the reactor in the continuum flow regime.

TABLE 4

| Restrictor length for maintaining the outlet pressure at a specified value. | |
|---|---|
| $P_1$ (Torr) | $L_r$ (cm) |
| 400 | 2.79 |
| 500 | 3.46 |
| 600 | 4.13 |
| 760 | 5.20 |

Helium gas (Ultra High Purity, 99.999%) can be used as the inert carrier gas in the instant example. The maximum pumping capacity of the high vacuum pump at the Syncrotron facility at LBNL is 280 ml/min so experiments can be performed using this inlet flowrate. The average residence time (τ) inside the probe can be calculated to be about 180 ms at this inlet flow rate.

Figure 11:
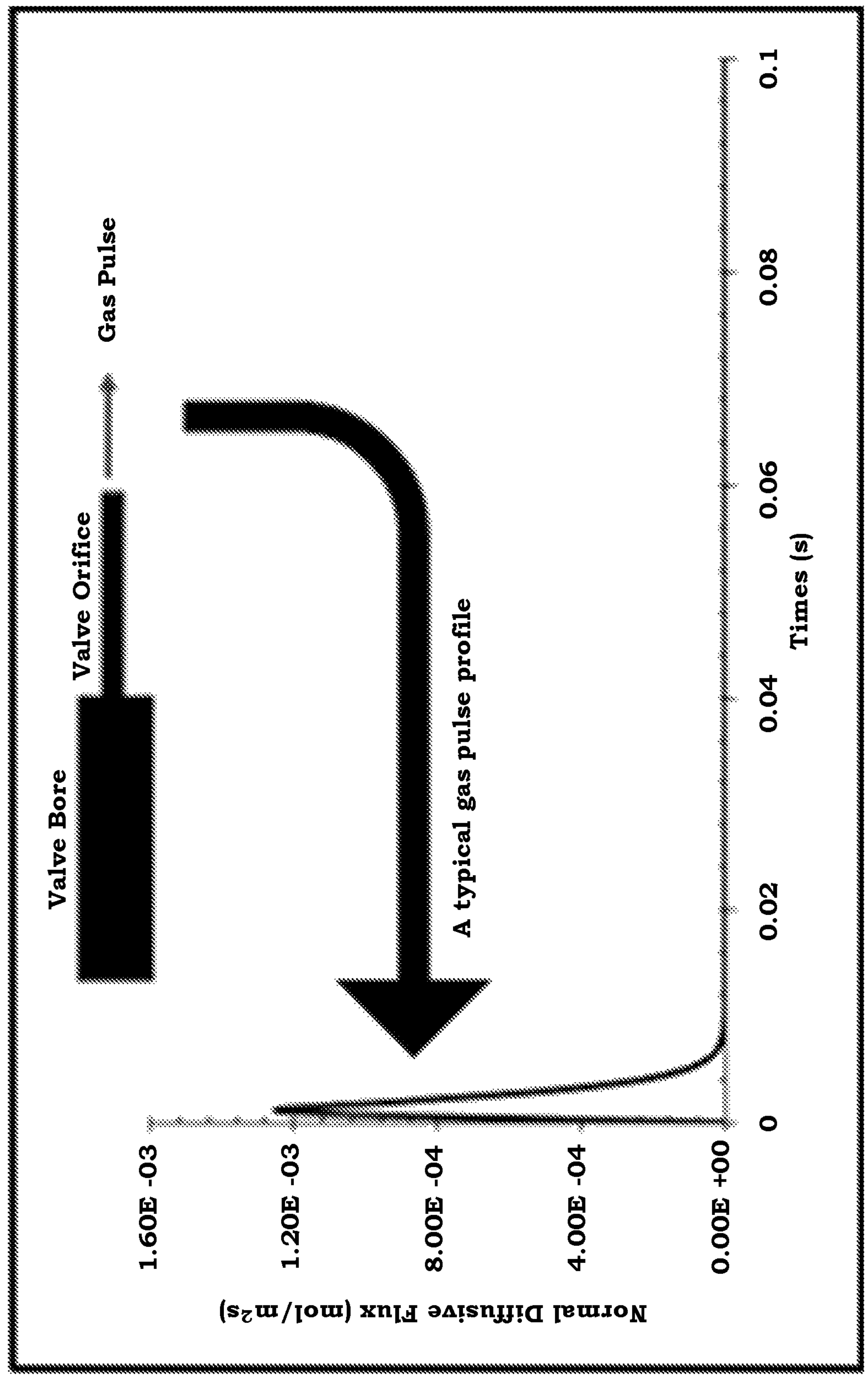
FIG. 11 shows a simulated gas pulse intensity profile for a 1 ms pulse width.

The pulse valve interfaced with the pyroprobe can be controlled by using an Iota One pulse valve driver (Parker Hannifin). The pulse intensity of the carrier gas (UHP helium) can be collected under both "one shot and "cycle" operating modes. The typical range of pulse times for both "one shot" and "cycle" operating modes are provided in Table 5 below. A typical pulse intensity profile for a 1 ms pulse width is shown in FIG. 11.

These experiments can be performed by using a photon energy of 24.6 eV (ionization potential of helium) at the Chemical Dynamics Beamline End Station 9.0.2 at LBNL. The resulting data can facilitate identification of the required pulse width that would fall within the sensitivity range of the SVUV-PIMS instrument at LBNL.

TABLE 5

| Range of pulse times for "one shot" and "cycle" operating modes. | | | |
|---|---|---|---|
| Operating Mode | On-Time (milliseconds) | Off-Time (milliseconds) | Pulses/Second |
| One Shot | 1-20 | Not Applicable | Not Applicable |
| Cycle | 1-20 | 1-20 | 1000-50 |

Example 4

Real-Time Monitoring of Products from Fast Pyrolysis of Cellobiose and Glucose

The instant example can illustrate measurement of the time evolution profiles of furan and its derivatives, along with other reactive and stable intermediates during the fast pyrolysis of glucose and cellulose utilizing the apparatus (e.g., including a SVUV-PIMS instrument). The pulse intensity data from Example 3 can be used to define the pulse width and required cycle time to detect products present in the pyrolysis vapor. Value for the process variables that produce maximum furan product yields are shown in Table 6 and Table 7 below. These values can be estimated using traditional pyroprobe-GC-MS/FID methods.

These process variable settings can be used to collect millisecond-range time evolution data of furans during fast pyrolysis of glucose and cellobiose. These results can provide critical information on the underlying reaction mechanisms for the formation of furans during fast pyrolysis of the two model compounds.

TABLE 6

| Values of process variables used to collect time evolution profiles of furans during the fast pyrolysis of cellobiose using the apparatus. Variable Settings for Maximum Yield of Furans | |
|---|---|
| Variable | Value |
| Heating Rate, ° C./ms | 7 |
| Temperature, ° C. | 400 |
| Time, s | 6 |

TABLE 7

| Values of process variables used to collect time evolution profiles of furans during the fast pyrolysis of glucose using the apparatus. Variable Settings for Maximum Yield of Furans | |
|---|---|
| Variable | Value |
| Heating Rate, ° C./ms | 0.1 |
| Temperature, ° C. | 400 |
| Time, s | 1 |

Example 5

Real-Time Monitoring of Products from Fast Pyrolysis of Rio Red Grapefruit Waste (GPW)

The instant example utilizes the methods of Example 4, except that Rio Red grapefruit processing waste (GPW) can be used as the pyrolysis feedstock. The time evolution profiles of phenols along with other possible reactive and stable intermediates can be monitored and identified. The pulse intensity data collected in Example 3 can be used to define the pulse width and cycle time of the pyrolysis vapor. The values of the process variables that lead to maximum and minimum phenol yields can be statistically estimated by using traditional Py-GC-MS/FID methods. These process variable settings can be used to collect millisecond range time evolution profile of phenols during fast pyrolysis of GPW. Value for the process variables are shown in Table 8 below. These results can provide critical information on the underlying reaction mechanisms for the formation of phenols during the fast pyrolysis of GPW.

TABLE 8

Values of process variables used to collect time evolution profiles of phenols during fast pyrolysis of GPW using the apparatus.

| Variable | Value |
|---|---|
| Variable Settings for Maximum Yield of Phenols | |
| Heating Rate, ° C./ms | 16 |
| Temperature, ° C. | 1000 |
| Time, s | 10 |
| Variable Settings for Minimum Yield of Phenols | |
| Heating Rate, ° C./ms | 20 |
| Temperature, ° C. | 400 |
| Time, s | 10 |

Example 6

Real-Time Monitoring of Products from Fast Pyrolysis of Lignin-Based Model Compounds The instant example utilizes the methods of Example 5, except that 2-phenoxy-1-phenylethanol (i.e., a model compound for ligin) can be used as the pyrolysis feedstock. The time evolution profiles of possible reactive and stable intermediates from this compound can be monitored and identified. The pulse intensity data collected in Example 3 can be used to define the pulse width and cycle time of the pyrolysis vapor. The values of the process variables that lead to maximum and minimum yields of phenylethanol and its derivative can be statistically estimated by using traditional Py-GC-MS/FID methods.

Example 7

Effect of Pressure on Time Evolution Profiles of Fast Pyrolysis Products

The methods of Examples 4, 5, and 6 can be repeated by modifying the reactor pressure, which is one means of changing the concentration of molecules present in the pyrolysis vapor. Table 4 shows the restrictor length that can be utilized for this purpose. The results from these experiments can provide critical information regarding the interplay between heating rate, pyrolysis temperature, pyrolysis time, and reactor pressure.

The invention claimed is:

1. A method for analyzing one or more intermediate products formed via a fast pyrolysis reaction, said method comprising the steps of:

i) performing the fast pyrolysis reaction on a solid biomass composition to produce a pyrolysis vapor;

ii) pulsing one or more portions of the pyrolysis vapor through a valve; and iii) analyzing the one or more portions of the pyrolysis vapor to identify the one or more intermediate products, wherein the fast pyrolysis reaction is performed at a heating rate of greater than 10° C. per millisecond (ms).

2. The method of claim 1, wherein the fast pyrolysis reaction is performed at a temperature in a range from 600° C.-800° C.

3. The method of claim 1, wherein the fast pyrolysis reaction is performed at a temperature in a range from 400° C.-600° C.

4. The method of claim 1, wherein the fast pyrolysis reaction is performed at a heating rate of 15° C. per millisecond (ms).

5. The method of claim 1, wherein the fast pyrolysis reaction is performed for a duration in a range from 1 second to 5 seconds.

6. The method of claim 1, wherein the solid biomass composition comprises agricultural waste.

7. The method of claim 1, wherein the solid biomass composition comprises citrus waste.

8. The method of claim 1, wherein the solid biomass composition further comprises a catalyst.

9. The method of claim 1, wherein the valve is coupled to a probe rod assembly and to an interface housing.

10. The method of claim 9, wherein the valve is positioned between the inlet and the outlet of the interface housing.

11. The method of claim 1, wherein the step of pulsing is performed at a duration of between 100 milliseconds and 200 milliseconds.

12. The method of claim 1, wherein the step of pulsing is performed at a repetition rate of greater than 100 pulses within 5 seconds.

13. The method of claim 1, wherein the step of analyzing is performed via gas chromatography (GC), mass spectrometry (MS), gas chromatography-mass spectrometry (GC-MS), time-of-flight mass spectrometer, infrared (IR) analysis, or any combination thereof.

14. The method of claim 1, wherein the one or more intermediate products are indicative of one or more pyrolysis products.

15. The method of claim 1, wherein the step of pulsing is performed at a repetition rate of greater than 10 pulses within 5 seconds.

16. An apparatus for fast pyrolysis, said apparatus comprising i) a valve, ii) a probe rod assembly, and iii) an interface housing, wherein the apparatus is configured for performing a fast pyrolysis reaction at a heating rate of greater than 10° C. per millisecond (ms).

17. The apparatus of claim 16, wherein the valve is coupled to the probe rod assembly and to the interface housing.

18. The apparatus of claim 17, wherein the valve is positioned between the inlet and the outlet of the interface housing.

19. The apparatus of claim 16, wherein the apparatus is configured for pulsing one or more portions of pyrolysis vapor through the valve to an instrument, wherein the instrument is selected from the group consisting of a gas chromatography (GC) instrument, a mass spectrometry (MS) instrument, a gas chromatography-mass spectrometry (GC-MS) instrument, a time-of-flight mass spectrometer, and an infrared (IR) analysis instrument.

20. The apparatus of claim 16, wherein the valve is configured to pulse one or more portions of pyrolysis vapor through the valve.

* * * * *